(12) United States Patent
Eisen et al.

(10) Patent No.: US 12,453,640 B2
(45) Date of Patent: Oct. 28, 2025

(54) ADJUSTABLE SPINAL IMPLANTS, ASSOCIATED INSTRUMENTS AND METHODS

(71) Applicant: Blue Ocean Spine GmbH, Tuttlingen (DE)

(72) Inventors: Guntmar Eisen, Tuttlingen-Möhringen (DE); Markus Salvermoser, Tuttlingen-Möhringen (DE); Jacob Richter, Tuttlingen (DE)

(73) Assignee: Blue Ocean Spine GmbH, Tuttlingen (DE)

( * ) Notice: Subject to any disclaimer, the term of this patent is extended or adjusted under 35 U.S.C. 154(b) by 669 days.

(21) Appl. No.: 17/865,771

(22) Filed: Jul. 15, 2022

(65) Prior Publication Data

US 2023/0015512 A1    Jan. 19, 2023

Related U.S. Application Data

(60) Provisional application No. 63/222,498, filed on Jul. 16, 2021, provisional application No. 63/222,506, (Continued)

(51) Int. Cl.
*A61F 2/44* (2006.01)
*A61F 2/30* (2006.01)
*A61F 2/46* (2006.01)

(52) U.S. Cl.
CPC .......... *A61F 2/4455* (2013.01); *A61F 2/4611* (2013.01); *A61F 2002/30405* (2013.01); (Continued)

(58) Field of Classification Search
CPC ................................................ A61F 2/44–447
See application file for complete search history.

(56) References Cited

U.S. PATENT DOCUMENTS

| | | | |
|---|---|---|---|
| 5,676,702 | A | 10/1997 | Ratron |
| 6,102,950 | A | 8/2000 | Vaccaro |

(Continued)

FOREIGN PATENT DOCUMENTS

| | | |
|---|---|---|
| AU | 2015268677 A1 | 6/2016 |
| DE | 10307758 B4 | 2/2005 |

(Continued)

OTHER PUBLICATIONS

US 10,940,020 B2, 03/2021, Branch et al. (withdrawn)
(Continued)

*Primary Examiner* — Nicholas J Plionis
(74) *Attorney, Agent, or Firm* — Farber LLC

(57) ABSTRACT

The present disclosure provides adjustable spinal devices, instruments for implanting the spinal devices, methods for adjusting the height and lordosis angles of the spinal devices and methods for implanting such devices. An adjustable spinal fusion device includes an upper plate component having an outer surface for placement against an endplate of a vertebral body and a lower plate component having an outer surface for placement against an endplate of a vertebral body. The device further includes a first translation member configured to move longitudinally relative to the upper and lower plates to adjust a distance between the upper and lower plates and a second translation member configured to move longitudinally relative to the upper and lower plates to adjust an angle between the upper and lower plates.

26 Claims, 26 Drawing Sheets

Related U.S. Application Data filed on Jul. 16, 2021, provisional application No. 63/222,482, filed on Jul. 16, 2021.

(52) U.S. Cl.
CPC .............. *A61F 2002/3054* (2013.01); *A61F 2002/30579* (2013.01); *A61F 2002/30593* (2013.01); *A61F 2002/30772* (2013.01); *A61F 2002/4627* (2013.01)

(56) References Cited

U.S. PATENT DOCUMENTS

| | | | |
|---|---|---|---|
| 6,126,689 A | 10/2000 | Brett | |
| 6,179,873 B1 | 1/2001 | Zientek | |
| 6,395,031 B1 | 5/2002 | Foley et al. | |
| 6,409,766 B1 | 6/2002 | Brett | |
| 6,767,367 B1 | 7/2004 | Michelson | |
| 6,770,096 B2 | 8/2004 | Bolger et al. | |
| 6,852,129 B2 | 2/2005 | Gerbec et al. | |
| 6,905,512 B2 | 6/2005 | Paes et al. | |
| 6,953,477 B2 | 10/2005 | Berry | |
| 6,955,691 B2 | 10/2005 | Chae et al. | |
| 6,981,975 B2 | 1/2006 | Michelson | |
| 7,029,498 B2 | 4/2006 | Boehm et al. | |
| 7,094,257 B2 | 8/2006 | Mujwid et al. | |
| 7,112,206 B2 | 9/2006 | Michelson | |
| 7,267,689 B2 | 9/2007 | Kohrs et al. | |
| 7,431,735 B2 | 10/2008 | Liu | |
| 7,547,308 B2 | 6/2009 | Bertagnoli et al. | |
| 7,655,042 B2 | 2/2010 | Foley et al. | |
| 7,708,778 B2 | 5/2010 | Gordon et al. | |
| 7,727,280 B2 | 6/2010 | Mcluen | |
| 7,780,675 B2 | 8/2010 | Schneid | |
| 7,828,849 B2 | 11/2010 | Lim | |
| 7,951,199 B2 | 5/2011 | Miller | |
| 7,972,365 B2 | 7/2011 | Michelson | |
| 8,025,665 B2 | 9/2011 | Lim et al. | |
| 8,062,373 B2 | 11/2011 | Fabian, Jr. | |
| 8,062,374 B2 | 11/2011 | Markworth et al. | |
| 8,080,062 B2 | 12/2011 | Armstrong et al. | |
| 8,110,004 B2 | 2/2012 | Valdevit et al. | |
| 8,167,950 B2 | 5/2012 | Aferson et al. | |
| 8,187,332 B2 | 5/2012 | Mcluen | |
| 8,206,399 B2 | 6/2012 | Gill et al. | |
| 8,206,449 B2 | 6/2012 | Jansen et al. | |
| 8,221,501 B2 | 7/2012 | Eisermann et al. | |
| 8,221,502 B2 | 7/2012 | Branch, Jr. | |
| 8,241,358 B2 | 8/2012 | Butler et al. | |
| 8,246,686 B1 | 8/2012 | Curran et al. | |
| 8,273,125 B2 | 9/2012 | Baccelli et al. | |
| 8,287,572 B2 | 10/2012 | Bae et al. | |
| 8,292,958 B1 | 10/2012 | Bruffey et al. | |
| 8,303,658 B2 | 11/2012 | Peterman | |
| 8,349,014 B2 | 1/2013 | Barreiro et al. | |
| 8,349,015 B2 | 1/2013 | Bae et al. | |
| 8,361,148 B2 | 1/2013 | Malberg et al. | |
| 8,366,774 B1 | 2/2013 | Bruffey et al. | |
| 8,377,071 B2 | 2/2013 | Lim et al. | |
| 8,382,768 B2 | 2/2013 | Berry et al. | |
| 8,382,842 B2 | 2/2013 | Greenhalgh et al. | |
| 8,394,143 B2 | 3/2013 | Grotz et al. | |
| 8,394,145 B2 | 3/2013 | Weiman | |
| 8,398,713 B2 | 3/2013 | Weiman | |
| 8,403,990 B2 | 3/2013 | Dryer et al. | |
| 8,409,291 B2 | 4/2013 | Blackwell et al. | |
| 8,425,528 B2 | 4/2013 | Berry et al. | |
| 8,435,296 B2 | 5/2013 | Kadaba et al. | |
| 8,435,298 B2 | 5/2013 | Weiman | |
| 8,449,554 B2 | 5/2013 | Mcclintock | |
| 8,454,695 B2 | 6/2013 | Grotz et al. | |
| 8,460,385 B1 | 6/2013 | Wensel | |
| 8,480,748 B2 | 7/2013 | Poulos | |
| 8,486,147 B2 | 7/2013 | De Villiers et al. | |
| 8,486,149 B2 | 7/2013 | Saidha et al. | |
| 8,491,659 B2 | 7/2013 | Weiman | |
| 8,496,706 B2 | 7/2013 | Ragab et al. | |
| 8,506,635 B2 | 8/2013 | Palmatier et al. | |
| 8,512,348 B2 | 8/2013 | Chabansky et al. | |
| 8,518,120 B2 | 8/2013 | Glerum et al. | |
| 8,523,944 B2 | 9/2013 | Jimenez et al. | |
| 8,523,945 B1 | 9/2013 | Wensel | |
| 8,540,452 B2 | 9/2013 | Jimenez et al. | |
| 8,545,562 B1 | 10/2013 | Materna et al. | |
| 8,545,563 B2 | 10/2013 | Brun et al. | |
| 8,574,299 B2 | 11/2013 | Barreiro et al. | |
| 8,579,907 B2 | 11/2013 | Lim et al. | |
| 8,579,981 B2 | 11/2013 | Lim et al. | |
| 8,579,982 B2 | 11/2013 | Michelson | |
| 8,597,353 B2 | 12/2013 | Kana et al. | |
| 8,603,170 B2 | 12/2013 | Cipoletti et al. | |
| 8,617,245 B2 | 12/2013 | Brett | |
| 8,617,247 B2 | 12/2013 | Lechmann et al. | |
| 8,628,576 B2 | 1/2014 | Triplett et al. | |
| 8,628,577 B1 | 1/2014 | Jimenez | |
| 8,632,595 B2 | 1/2014 | Weiman | |
| 8,641,766 B2 | 2/2014 | Donner et al. | |
| 8,663,329 B2 | 3/2014 | Ernst | |
| 8,663,331 B2 | 3/2014 | Mcclellan, III et al. | |
| 8,663,332 B1 | 3/2014 | To et al. | |
| 8,685,095 B2 | 4/2014 | Miller et al. | |
| 8,685,098 B2 | 4/2014 | Glerum et al. | |
| 8,685,104 B2 | 4/2014 | Lee et al. | |
| 8,709,086 B2 | 4/2014 | Glerum | |
| 8,715,350 B2 | 5/2014 | Janowski et al. | |
| 8,778,025 B2 | 7/2014 | Ragab et al. | |
| 8,778,027 B2 | 7/2014 | Medina | |
| 8,795,366 B2 | 8/2014 | Varela | |
| 8,801,721 B2 | 8/2014 | Berry et al. | |
| 8,801,792 B2 | 8/2014 | De Villiers et al. | |
| 8,845,731 B2 | 9/2014 | Weiman | |
| 8,845,732 B2 | 9/2014 | Weiman | |
| 8,845,733 B2 | 9/2014 | O'Neil et al. | |
| 8,845,734 B2 | 9/2014 | Weiman | |
| 8,845,738 B2 | 9/2014 | Michelson | |
| 8,852,279 B2 | 10/2014 | Weiman | |
| 8,858,564 B2 | 10/2014 | Errico et al. | |
| 8,876,829 B2 | 11/2014 | Lee | |
| 8,888,853 B2 | 11/2014 | Glerum et al. | |
| 8,888,854 B2 | 11/2014 | Glerum et al. | |
| 8,894,711 B2 | 11/2014 | Varela | |
| 8,894,712 B2 | 11/2014 | Varela | |
| 8,906,100 B2 | 12/2014 | Jimenez et al. | |
| 8,906,101 B2 | 12/2014 | Lee et al. | |
| 8,920,505 B2 | 12/2014 | Aferson et al. | |
| 8,926,704 B2 | 1/2015 | Glerum et al. | |
| 8,940,052 B2 | 1/2015 | Lechmann et al. | |
| 8,956,413 B2 | 2/2015 | Ashley et al. | |
| 8,968,405 B2 | 3/2015 | Kirwan et al. | |
| 8,979,933 B2 | 3/2015 | Vishnubholta et al. | |
| 8,986,389 B2 | 3/2015 | Lim et al. | |
| 8,998,920 B2 | 4/2015 | Berry et al. | |
| 9,005,291 B2 | 4/2015 | Loebl et al. | |
| 9,034,045 B2 | 5/2015 | Davenport et al. | |
| 9,039,771 B2 | 5/2015 | Glerum et al. | |
| 9,044,337 B2 | 6/2015 | Dinville et al. | |
| 9,050,194 B2 | 6/2015 | Thibodeau | |
| 9,066,810 B2 | 6/2015 | Hasse et al. | |
| 9,066,813 B2 | 6/2015 | Farris et al. | |
| 9,101,489 B2 | 8/2015 | Protopsaltis et al. | |
| 9,101,493 B2 | 8/2015 | Trudeau et al. | |
| 9,107,761 B2 | 8/2015 | Lee et al. | |
| 9,119,726 B2 | 9/2015 | Wei | |
| 9,119,730 B2 | 9/2015 | Glerum et al. | |
| 9,125,757 B2 | 9/2015 | Weiman | |
| 9,138,275 B2 | 9/2015 | Bae et al. | |
| 9,138,276 B2 | 9/2015 | Bae et al. | |
| 9,138,328 B2 | 9/2015 | Butler et al. | |
| 9,173,749 B2 | 11/2015 | Jacofsky et al. | |
| 9,186,258 B2 | 11/2015 | Davenport et al. | |
| 9,204,974 B2 | 12/2015 | Glerum et al. | |
| 9,211,195 B2 | 12/2015 | Poulos | |
| 9,211,196 B2 | 12/2015 | Glerum et al. | |
| 9,220,606 B2 | 12/2015 | Janowski et al. | |
| 9,226,836 B2 | 1/2016 | Glerum | |

(56) References Cited

U.S. PATENT DOCUMENTS

| | | |
|---|---|---|
| 9,233,007 B2 | 1/2016 | Sungarian et al. |
| 9,233,009 B2 | 1/2016 | Gray et al. |
| 9,259,328 B2 | 2/2016 | Pabst et al. |
| 9,271,777 B2 | 3/2016 | Nichols et al. |
| 9,271,846 B2 | 3/2016 | Lim et al. |
| 9,308,099 B2 | 4/2016 | Triplett et al. |
| 9,314,348 B2 | 4/2016 | Emstad |
| 9,320,610 B2 | 4/2016 | Alheidt et al. |
| 9,333,092 B2 | 5/2016 | To et al. |
| 9,345,588 B2 | 5/2016 | Himmelberger et al. |
| 9,351,847 B2 | 5/2016 | Reed et al. |
| 9,351,848 B2 | 5/2016 | Glerum et al. |
| 9,358,123 B2 | 6/2016 | Mcluen et al. |
| 9,358,128 B2 | 6/2016 | Glerum et al. |
| 9,358,129 B2 | 6/2016 | Weiman |
| 9,358,131 B2 | 6/2016 | Lorio et al. |
| 9,370,433 B1 | 6/2016 | Morris et al. |
| 9,370,434 B2 | 6/2016 | Weiman |
| 9,381,092 B2 | 7/2016 | Jimenez et al. |
| 9,393,130 B2 | 7/2016 | Suddaby et al. |
| 9,402,733 B1 | 8/2016 | To et al. |
| 9,408,708 B2 | 8/2016 | Greenhalgh |
| 9,408,710 B2 | 8/2016 | Purcell et al. |
| 9,414,936 B2 | 8/2016 | Miller et al. |
| 9,421,110 B2 | 8/2016 | Masson et al. |
| 9,439,771 B2 | 9/2016 | Packer et al. |
| 9,445,913 B2 | 9/2016 | Donner et al. |
| 9,445,917 B2 | 9/2016 | Jimenez et al. |
| 9,445,920 B2 | 9/2016 | Baynham |
| 9,452,063 B2 | 9/2016 | Glerum et al. |
| 9,456,903 B2 | 10/2016 | Glerum et al. |
| 9,456,906 B2 | 10/2016 | Gray et al. |
| 9,463,091 B2 | 10/2016 | Brett |
| 9,463,099 B2 | 10/2016 | Levy et al. |
| 9,474,622 B2 | 10/2016 | Mclaughlin et al. |
| 9,474,625 B2 | 10/2016 | Weiman |
| 9,480,573 B2 | 11/2016 | Perloff et al. |
| 9,480,579 B2 | 11/2016 | Davenport et al. |
| 9,486,325 B2 | 11/2016 | Davenport et al. |
| 9,492,285 B2 | 11/2016 | Saidha et al. |
| 9,492,287 B2 | 11/2016 | Glerum et al. |
| 9,492,288 B2 | 11/2016 | Wagner et al. |
| 9,492,289 B2 | 11/2016 | Davenport et al. |
| 9,498,349 B2 | 11/2016 | Patterson et al. |
| 9,498,350 B2 | 11/2016 | Theofilos et al. |
| 9,510,954 B2 | 12/2016 | Glerum et al. |
| 9,510,955 B2 | 12/2016 | Marino et al. |
| 9,539,108 B2 | 1/2017 | Glerum et al. |
| 9,554,918 B2 | 1/2017 | Weiman |
| 9,561,117 B2 | 2/2017 | Lechmann et al. |
| 9,566,163 B2 | 2/2017 | Suddaby et al. |
| 9,572,677 B2 | 2/2017 | Davenport et al. |
| 9,572,685 B2 | 2/2017 | Perry |
| 9,585,766 B2 | 3/2017 | Robinson |
| 9,597,200 B2 | 3/2017 | Glerum et al. |
| 9,603,715 B2 | 3/2017 | Thibodeau |
| 9,603,717 B2 | 3/2017 | Ibarra et al. |
| 9,610,172 B2 | 4/2017 | Butler et al. |
| 9,622,876 B1 | 4/2017 | Greenhalgh et al. |
| 9,642,720 B2 | 5/2017 | Radcliffe et al. |
| 9,642,721 B2 | 5/2017 | Patterson et al. |
| 9,655,737 B2 | 5/2017 | Perloff et al. |
| 9,655,740 B1 | 5/2017 | Faulkner et al. |
| 9,655,747 B2 | 5/2017 | Glerum et al. |
| 9,662,224 B2 | 5/2017 | Weiman et al. |
| 9,687,359 B2 | 6/2017 | Perrow |
| 9,693,876 B1 | 7/2017 | Mesiwala |
| 9,700,430 B2 | 7/2017 | Perrow |
| 9,707,092 B2 | 7/2017 | Davenport et al. |
| 9,707,095 B2 | 7/2017 | Emstad |
| 9,707,099 B2 | 7/2017 | Schiffman et al. |
| 9,707,100 B2 | 7/2017 | Duffield et al. |
| 9,717,600 B1 | 8/2017 | Wensel |
| 9,730,802 B1 | 8/2017 | Harvey |
| 9,737,412 B2 | 8/2017 | Brett |
| 9,750,616 B2 | 9/2017 | Blain et al. |
| 9,750,617 B2 | 9/2017 | Lim et al. |
| 9,750,618 B1 | 9/2017 | Daffinson et al. |
| 9,757,249 B2 | 9/2017 | Radcliffe et al. |
| 9,757,252 B2 | 9/2017 | Lee et al. |
| 9,763,803 B2 | 9/2017 | Dinville et al. |
| 9,770,343 B2 | 9/2017 | Weiman |
| 9,802,297 B2 | 10/2017 | Marchand |
| 9,808,353 B2 | 11/2017 | Suddaby et al. |
| 9,820,866 B2 | 11/2017 | Whipple |
| 9,827,107 B1 | 11/2017 | Arnin |
| 9,833,336 B2 | 12/2017 | Davenport et al. |
| 9,844,445 B2 | 12/2017 | Mcmanus et al. |
| 9,848,997 B2 | 12/2017 | Glerum et al. |
| 9,855,151 B2 | 1/2018 | Weiman |
| 9,861,497 B2 | 1/2018 | Baynham |
| 9,867,715 B2 | 1/2018 | Mclaughlin et al. |
| 9,872,779 B2 | 1/2018 | Miller et al. |
| 9,889,019 B2 | 2/2018 | Rogers et al. |
| 9,901,459 B2 | 2/2018 | Faulhaber |
| 9,907,673 B2 | 3/2018 | Weiman et al. |
| 9,913,726 B2 | 3/2018 | Weiman |
| 9,925,062 B2 | 3/2018 | Glerum et al. |
| 9,931,222 B2 | 4/2018 | Grotz et al. |
| 9,937,052 B2 | 4/2018 | Abdou et al. |
| 9,943,418 B2 | 4/2018 | Davenport et al. |
| 9,949,841 B2 | 4/2018 | Glerum et al. |
| 9,949,846 B2 | 4/2018 | Duffield et al. |
| 9,956,087 B2 | 5/2018 | Seifert et al. |
| 9,962,270 B2 | 5/2018 | Alheidt et al. |
| 9,962,271 B2 | 5/2018 | Glerum |
| 9,962,272 B1 | 5/2018 | Daffinson et al. |
| 9,968,462 B2 | 5/2018 | Weiman |
| 9,974,662 B2 | 5/2018 | Hessler et al. |
| 9,974,664 B2 | 5/2018 | Emerick et al. |
| 9,980,822 B2 | 5/2018 | Perloff et al. |
| 9,987,142 B2 | 6/2018 | Mcconnell |
| 9,987,146 B1 | 6/2018 | Lentner et al. |
| 9,999,517 B2 | 6/2018 | To et al. |
| 10,010,430 B2 | 7/2018 | Glerum et al. |
| 10,016,282 B2 | 7/2018 | Seifert et al. |
| 10,022,239 B1 | 7/2018 | Lentner et al. |
| 10,022,241 B2 | 7/2018 | Faulhaber et al. |
| 10,022,245 B2 | 7/2018 | Frasier et al. |
| 10,028,842 B2 | 7/2018 | Gray et al. |
| 10,034,765 B2 | 7/2018 | Blain et al. |
| 10,034,769 B2 | 7/2018 | Baynham |
| 10,034,772 B2 | 7/2018 | Glerum et al. |
| 10,034,773 B2 | 7/2018 | Mclaughlin et al. |
| 10,052,213 B2 | 8/2018 | Glerum et al. |
| 10,052,215 B2 | 8/2018 | Hessler et al. |
| 10,058,433 B2 | 8/2018 | Lechmann et al. |
| 10,058,435 B2 | 8/2018 | Lee et al. |
| 10,060,469 B2 | 8/2018 | Jimenez et al. |
| 10,070,971 B2 | 9/2018 | Palmatier et al. |
| 10,076,421 B2 | 9/2018 | Dewey |
| 10,080,666 B2 | 9/2018 | Suddaby et al. |
| 10,080,669 B2 | 9/2018 | Davenport et al. |
| 10,092,422 B2 | 10/2018 | Mcluen et al. |
| 10,098,755 B2 | 10/2018 | Kaufmann et al. |
| 10,098,756 B2 | 10/2018 | Emstad |
| 10,098,757 B2 | 10/2018 | Logan et al. |
| 10,098,758 B2 | 10/2018 | Matthews et al. |
| 10,098,759 B2 | 10/2018 | Weiman |
| 10,105,236 B2 | 10/2018 | Donner et al. |
| 10,105,238 B2 | 10/2018 | Koch et al. |
| 10,137,001 B2 | 11/2018 | Weiman |
| 10,137,007 B2 | 11/2018 | Dewey et al. |
| 10,143,569 B2 | 12/2018 | Weiman et al. |
| 10,149,770 B2 | 12/2018 | Loebl et al. |
| 10,154,912 B2 | 12/2018 | Glerum |
| 10,172,718 B2 | 1/2019 | Wolters et al. |
| 10,182,922 B2 | 1/2019 | Nichols et al. |
| 10,188,524 B2 | 1/2019 | Buss |
| 10,188,526 B2 | 1/2019 | Kuyler |
| 10,188,527 B2 | 1/2019 | Rogers et al. |
| 10,195,050 B2 | 2/2019 | Palmatier et al. |
| 10,206,788 B2 | 2/2019 | Field et al. |
| 10,219,913 B2 | 3/2019 | Matthews et al. |

(56) References Cited

U.S. PATENT DOCUMENTS

| | | |
|---|---|---|
| 10,219,914 B2 | 3/2019 | Faulhaber |
| 10,219,916 B2 | 3/2019 | Tanaka et al. |
| 10,226,355 B2 | 3/2019 | Zeegers |
| 10,226,359 B2 | 3/2019 | Glerum et al. |
| 10,238,503 B2 | 3/2019 | Branch et al. |
| 10,265,191 B2 | 4/2019 | Lim et al. |
| 10,265,192 B2 | 4/2019 | Eastlack et al. |
| 10,271,959 B2 | 4/2019 | Bae et al. |
| 10,271,961 B2 | 4/2019 | Aferzon et al. |
| 10,278,830 B1 | 5/2019 | Walker et al. |
| 10,278,831 B2 | 5/2019 | Sandul |
| 10,285,820 B2 | 5/2019 | Greenhalgh |
| 10,292,828 B2 | 5/2019 | Greenhalgh |
| 10,292,830 B2 | 5/2019 | Mcluen et al. |
| 10,292,835 B2 | 5/2019 | Barreiro et al. |
| 10,307,265 B2 | 6/2019 | Sack |
| 10,314,719 B2 | 6/2019 | Hessler et al. |
| 10,322,007 B2 | 6/2019 | Masson et al. |
| 10,322,010 B2 | 6/2019 | Bannigan |
| 10,327,917 B2 | 6/2019 | Glerum et al. |
| 10,350,081 B2 | 7/2019 | Seifert et al. |
| 10,350,084 B1 | 7/2019 | Lin et al. |
| 10,350,085 B2 | 7/2019 | Glerum et al. |
| 10,363,142 B2 | 7/2019 | Mcclintock et al. |
| 10,376,378 B2 | 8/2019 | Ashleigh et al. |
| 10,390,962 B2 | 8/2019 | Weiman |
| 10,390,963 B2 | 8/2019 | Olmos et al. |
| 10,398,565 B2 | 9/2019 | Bender et al. |
| 10,398,566 B2 | 9/2019 | Olmos et al. |
| 10,398,567 B2 | 9/2019 | Robinson |
| 10,398,573 B2 | 9/2019 | Duffield et al. |
| 10,405,988 B2 | 9/2019 | Grotz et al. |
| 10,405,992 B2 | 9/2019 | Sack |
| 10,413,419 B2 | 9/2019 | Thibodeau |
| 10,413,422 B2 | 9/2019 | Flower et al. |
| 10,433,975 B2 | 10/2019 | Ashleigh et al. |
| 10,441,430 B2 | 10/2019 | Ludwig et al. |
| 10,441,433 B2 | 10/2019 | Patel et al. |
| 10,449,060 B2 | 10/2019 | Sack |
| 10,485,674 B2 | 11/2019 | Perloff et al. |
| 10,485,675 B2 | 11/2019 | Sharifi-Mehr et al. |
| 10,507,116 B2 | 12/2019 | Shoshtaev |
| 10,512,551 B2 | 12/2019 | Eastlack et al. |
| 10,524,924 B2 | 1/2020 | Davenport et al. |
| 10,524,929 B2 | 1/2020 | Shoshtaev |
| 10,524,930 B2 | 1/2020 | Duffield et al. |
| 10,531,961 B2 | 1/2020 | Dinville et al. |
| 10,531,964 B2 | 1/2020 | Miller et al. |
| 10,543,106 B2 | 1/2020 | Robinson |
| 10,543,108 B2 | 1/2020 | Dvorak et al. |
| 10,548,743 B2 | 2/2020 | Faulhaber |
| 10,568,747 B2 | 2/2020 | Boehm et al. |
| 10,575,960 B2 | 3/2020 | Duffield et al. |
| 10,583,015 B2 | 3/2020 | Olmos et al. |
| 10,610,374 B2 | 4/2020 | Shulock et al. |
| 10,610,376 B2 | 4/2020 | Kuyler et al. |
| 10,610,377 B2 | 4/2020 | Baynham |
| 10,617,530 B2 | 4/2020 | Siegal et al. |
| 10,617,533 B2 | 4/2020 | Glerum et al. |
| 10,631,997 B2 | 4/2020 | Ashleigh et al. |
| 10,639,166 B2 | 5/2020 | Weiman et al. |
| 10,646,351 B2 | 5/2020 | Blain et al. |
| 10,667,922 B2 | 6/2020 | Saidha et al. |
| 10,667,925 B2 | 6/2020 | Emerick et al. |
| 10,667,927 B2 | 6/2020 | Lamborne et al. |
| 10,682,239 B2 | 6/2020 | Hsu et al. |
| 10,682,241 B2 | 6/2020 | Glerum et al. |
| 10,702,391 B2 | 7/2020 | Ameil et al. |
| 10,702,392 B2 | 7/2020 | Greenhalgh |
| 10,702,393 B2 | 7/2020 | Davenport et al. |
| 10,702,396 B2 | 7/2020 | Burrows-Ownbey et al. |
| 10,709,571 B2 | 7/2020 | Iott et al. |
| 10,709,573 B2 | 7/2020 | Weiman et al. |
| 10,709,575 B2 | 7/2020 | Robinson |
| 10,722,377 B2 | 7/2020 | Glerum et al. |
| 10,722,379 B2 | 7/2020 | Mclaughlin et al. |
| 10,722,380 B1 | 7/2020 | Berry |
| 10,729,553 B2 | 8/2020 | Bell et al. |
| 10,729,561 B2 | 8/2020 | Glerum |
| 10,744,002 B2 | 8/2020 | Glerum et al. |
| 10,751,187 B2 | 8/2020 | Allain et al. |
| 10,758,368 B2 | 9/2020 | To et al. |
| 10,758,369 B2 | 9/2020 | Rogers et al. |
| 10,758,370 B2 | 9/2020 | Gilbride et al. |
| 10,758,371 B2 | 9/2020 | Hessler et al. |
| 10,765,528 B2 | 9/2020 | Weiman et al. |
| 10,765,532 B2 | 9/2020 | Ashleigh et al. |
| 10,772,737 B2 | 9/2020 | Gray et al. |
| 10,779,955 B2 | 9/2020 | Kuyler et al. |
| 10,779,956 B2 | 9/2020 | Perrow |
| 10,779,957 B2 | 9/2020 | Weiman et al. |
| 10,786,364 B2 | 9/2020 | Davenport et al. |
| 10,786,366 B2 | 9/2020 | To et al. |
| 10,786,367 B2 | 9/2020 | Sharabani |
| 10,786,368 B2 | 9/2020 | Riemhofer et al. |
| 10,799,368 B2 | 10/2020 | Glerum et al. |
| 10,806,592 B2 | 10/2020 | Donner et al. |
| 10,835,389 B2 | 11/2020 | Errico et al. |
| 10,842,633 B2 | 11/2020 | Predick et al. |
| 10,842,640 B2 | 11/2020 | Weiman et al. |
| 10,842,641 B2 | 11/2020 | Sharabani et al. |
| 10,842,643 B2 | 11/2020 | Farris et al. |
| 10,842,649 B2 | 11/2020 | Rogers et al. |
| 10,856,997 B2 | 12/2020 | Cowan et al. |
| 10,864,086 B2 | 12/2020 | Weiman |
| 10,864,087 B2 | 12/2020 | Faulhaber et al. |
| 10,869,768 B2 | 12/2020 | Weiman et al. |
| 10,869,769 B2 | 12/2020 | Eisen et al. |
| 10,874,522 B2 | 12/2020 | Weiman |
| 10,874,523 B2 | 12/2020 | Weiman et al. |
| 10,874,524 B2 | 12/2020 | Bjork |
| 10,881,524 B2 | 1/2021 | Eisen et al. |
| 10,881,531 B2 | 1/2021 | Berry |
| 10,888,433 B2 | 1/2021 | Frasier et al. |
| 10,888,434 B2 | 1/2021 | Adamo et al. |
| 10,888,435 B2 | 1/2021 | Adamo et al. |
| 10,898,344 B2 | 1/2021 | Alheidt et al. |
| 10,925,747 B2 | 2/2021 | Bae et al. |
| 10,925,748 B2 | 2/2021 | Grim et al. |
| 10,925,752 B2 | 2/2021 | Weiman |
| 10,932,920 B2 | 3/2021 | Dewey et al. |
| 10,940,014 B2 | 3/2021 | Greenhalgh |
| 10,940,016 B2 | 3/2021 | Thommen et al. |
| 10,940,018 B2 | 3/2021 | Sharifi-Mehr et al. |
| 10,940,025 B2 | 3/2021 | O'Neil et al. |
| 10,945,725 B2 | 3/2021 | Hollis et al. |
| 10,945,857 B2 | 3/2021 | Emstad |
| 10,945,859 B2 | 3/2021 | Ewer et al. |
| 10,959,856 B2 | 3/2021 | Seifert et al. |
| 10,973,648 B1 | 4/2021 | Abdou |
| 10,973,649 B2 | 4/2021 | Weiman et al. |
| 10,973,650 B2 | 4/2021 | Stein |
| 10,973,652 B2 | 4/2021 | Hawkins et al. |
| 10,980,589 B2 | 4/2021 | Defalco et al. |
| 10,980,642 B2 | 4/2021 | Glerum et al. |
| 10,980,644 B2 | 4/2021 | Purcell et al. |
| 10,987,233 B2 | 4/2021 | Siccardi et al. |
| 10,993,757 B2 | 5/2021 | Schifano et al. |
| 10,993,814 B2 | 5/2021 | Wolters |
| 10,993,815 B2 | 5/2021 | Ewer et al. |
| 10,993,816 B2 | 5/2021 | Kieser et al. |
| 11,000,385 B2 | 5/2021 | Kalhorn et al. |
| 11,007,067 B2 | 5/2021 | Masson et al. |
| 11,013,610 B2 | 5/2021 | Vigliotti et al. |
| 11,013,614 B2 | 5/2021 | Barreiro et al. |
| 11,013,617 B2 | 5/2021 | Weiman et al. |
| 11,020,238 B2 | 6/2021 | Nichols et al. |
| 11,020,239 B2 | 6/2021 | Miller et al. |
| 11,020,241 B2 | 6/2021 | Predick |
| 11,026,800 B2 | 6/2021 | Seifert et al. |
| 11,026,804 B2 | 6/2021 | Jimenez et al. |
| 11,033,401 B2 | 6/2021 | Shoshtaev |
| 11,033,402 B2 | 6/2021 | Melkent et al. |
| 11,033,403 B2 | 6/2021 | Predick et al. |

(56) References Cited

U.S. PATENT DOCUMENTS

| | | | |
|---|---|---|---|
| 11,033,404 B2 | 6/2021 | Faulhaber | |
| 11,045,325 B2 | 6/2021 | Bernard et al. | |
| 11,045,326 B2 | 6/2021 | Seifert et al. | |
| 2006/0122701 A1 | 6/2006 | Kiester | |
| 2008/0281346 A1 | 11/2008 | Greenhalgh | |
| 2009/0281629 A1 | 11/2009 | Roebling et al. | |
| 2012/0029644 A1 | 2/2012 | Markworth et al. | |
| 2012/0078371 A1 | 3/2012 | Gamache et al. | |
| 2012/0095559 A1 | 4/2012 | Woods et al. | |
| 2013/0085572 A1 | 4/2013 | Glerum et al. | |
| 2013/0116791 A1 | 5/2013 | Theofilos | |
| 2014/0094917 A1 | 4/2014 | Salerni | |
| 2014/0172104 A1 | 6/2014 | Dugal et al. | |
| 2014/0194992 A1 | 7/2014 | Medina | |
| 2014/0277501 A1 | 9/2014 | Northcutt et al. | |
| 2014/0379085 A1 | 12/2014 | Duffield et al. | |
| 2015/0100128 A1 | 4/2015 | Glerum et al. | |
| 2015/0182347 A1 | 7/2015 | Robinson | |
| 2015/0223946 A1* | 8/2015 | Weiman | A61F 2/4611 623/17.15 |
| 2015/0230931 A1 | 8/2015 | Greenhalgh | |
| 2015/0305880 A1 | 10/2015 | Kim et al. | |
| 2016/0095717 A1 | 4/2016 | Poulos | |
| 2016/0151169 A1 | 6/2016 | Hawkins et al. | |
| 2016/0256291 A1 | 9/2016 | Miller | |
| 2016/0310291 A1 | 10/2016 | Greenhalgh | |
| 2017/0042695 A1 | 2/2017 | Foley et al. | |
| 2017/0056179 A1 | 3/2017 | Lorio | |
| 2017/0100255 A1 | 4/2017 | Hleihil et al. | |
| 2017/0100257 A1 | 4/2017 | Weiman et al. | |
| 2017/0119538 A1 | 5/2017 | Baynham | |
| 2017/0165082 A1 | 6/2017 | Faulhaber | |
| 2017/0181863 A1 | 6/2017 | Bjork | |
| 2017/0196606 A1* | 7/2017 | Cianfrani | A61B 17/8042 |
| 2017/0231780 A1 | 8/2017 | D'Urso | |
| 2017/0239063 A1 | 8/2017 | Predick | |
| 2017/0281358 A1 | 10/2017 | Wagner et al. | |
| 2017/0290677 A1 | 10/2017 | Olmos et al. | |
| 2017/0319353 A1 | 11/2017 | Greenhalgh et al. | |
| 2017/0333198 A1 | 11/2017 | Robinson | |
| 2017/0333199 A1 | 11/2017 | Sharifi-Mehr et al. | |
| 2017/0333200 A1 | 11/2017 | Arnin | |
| 2017/0348115 A1 | 12/2017 | Greenhalgh et al. | |
| 2017/0348116 A1 | 12/2017 | Weiman | |
| 2017/0367844 A1 | 12/2017 | Eisen et al. | |
| 2017/0367845 A1 | 12/2017 | Eisen et al. | |
| 2018/0000606 A1* | 1/2018 | Hessler | A61F 2/447 |
| 2018/0064554 A1 | 3/2018 | Brett | |
| 2018/0064555 A1 | 3/2018 | Poulos | |
| 2018/0092753 A1 | 4/2018 | Dinville et al. | |
| 2018/0116815 A1 | 5/2018 | Kuyler | |
| 2018/0161175 A1 | 6/2018 | Frasier et al. | |
| 2018/0177603 A1 | 6/2018 | Weiman et al. | |
| 2018/0185163 A1 | 7/2018 | Weiman et al. | |
| 2018/0193164 A1 | 7/2018 | Shoshtaev | |
| 2018/0207003 A1 | 7/2018 | Melkent et al. | |
| 2018/0256359 A1 | 9/2018 | Greenhalgh | |
| 2018/0303621 A1 | 10/2018 | Brotman et al. | |
| 2018/0303625 A1 | 10/2018 | Alheidt et al. | |
| 2018/0311048 A1 | 11/2018 | Glerum et al. | |
| 2018/0318101 A1 | 11/2018 | Engstrom | |
| 2018/0325693 A1 | 11/2018 | Weiman et al. | |
| 2018/0338838 A1 | 11/2018 | Cryder et al. | |
| 2018/0344476 A1 | 12/2018 | Koch | |
| 2018/0360616 A1 | 12/2018 | Luu | |
| 2018/0368987 A9 | 12/2018 | Davis et al. | |
| 2019/0000640 A1 | 1/2019 | Weiman | |
| 2019/0008654 A1 | 1/2019 | Thommen et al. | |
| 2019/0021868 A1 | 1/2019 | Ludwig et al. | |
| 2019/0060083 A1 | 2/2019 | Weiman et al. | |
| 2019/0076263 A1 | 3/2019 | Emstad | |
| 2019/0091033 A1 | 3/2019 | Dewey et al. | |
| 2019/0091034 A1 | 3/2019 | Dewey et al. | |
| 2019/0091036 A1 | 3/2019 | Levy et al. | |
| 2019/0105174 A1 | 4/2019 | Kaufmann et al. | |
| 2019/0110900 A1 | 4/2019 | Suddaby | |
| 2019/0110902 A1 | 4/2019 | Vigliotti et al. | |
| 2019/0133780 A1 | 5/2019 | Matthews et al. | |
| 2019/0133784 A1 | 5/2019 | Gunn et al. | |
| 2019/0151111 A1 | 5/2019 | Dewey | |
| 2019/0151115 A1 | 5/2019 | Nichols et al. | |
| 2019/0168115 A1 | 6/2019 | Deridder et al. | |
| 2019/0183656 A1 | 6/2019 | Stein | |
| 2019/0201209 A1 | 7/2019 | Branch et al. | |
| 2019/0201210 A1* | 7/2019 | Besaw | A61F 2/4455 |
| 2019/0224017 A1 | 7/2019 | Grim et al. | |
| 2019/0224021 A1 | 7/2019 | Bae et al. | |
| 2019/0231548 A1 | 8/2019 | Ewer et al. | |
| 2019/0231552 A1 | 8/2019 | Sandul | |
| 2019/0240039 A1 | 8/2019 | Walker et al. | |
| 2019/0240043 A1 | 8/2019 | Greenhalgh | |
| 2019/0254836 A1 | 8/2019 | Cowan et al. | |
| 2019/0254839 A1 | 8/2019 | Nichols et al. | |
| 2019/0262139 A1 | 8/2019 | Wolters | |
| 2019/0262140 A1 | 8/2019 | Bannigan | |
| 2019/0262141 A1 | 8/2019 | Barreiro et al. | |
| 2019/0269521 A1 | 9/2019 | Shoshtaev | |
| 2019/0271997 A1 | 9/2019 | Harvey | |
| 2019/0274836 A1 | 9/2019 | Eisen et al. | |
| 2019/0274837 A1 | 9/2019 | Eisen et al. | |
| 2019/0274841 A1 | 9/2019 | Hawkes et al. | |
| 2019/0274845 A1 | 9/2019 | Ludwig et al. | |
| 2019/0282372 A1 | 9/2019 | Sack | |
| 2019/0282373 A1 | 9/2019 | Alheidt | |
| 2019/0290446 A1 | 9/2019 | Masson et al. | |
| 2019/0290448 A1 | 9/2019 | Predick et al. | |
| 2019/0298524 A1 | 10/2019 | Lauf et al. | |
| 2019/0298540 A1 | 10/2019 | Aghayev et al. | |
| 2019/0307577 A1 | 10/2019 | Predick et al. | |
| 2019/0314167 A1 | 10/2019 | Bender et al. | |
| 2019/0314168 A1 | 10/2019 | Faulhaber | |
| 2019/0321190 A1 | 10/2019 | Wagner et al. | |
| 2019/0321191 A1 | 10/2019 | Glerum et al. | |
| 2019/0328540 A1 | 10/2019 | Seifert et al. | |
| 2019/0328543 A1 | 10/2019 | Lin et al. | |
| 2019/0328544 A1 | 10/2019 | Ashley et al. | |
| 2019/0336299 A1 | 11/2019 | Bernard et al. | |
| 2019/0336300 A1 | 11/2019 | Bernard et al. | |
| 2019/0336301 A1 | 11/2019 | Engstrom | |
| 2019/0336302 A1 | 11/2019 | Seifert et al. | |
| 2019/0336303 A1 | 11/2019 | Ashleigh et al. | |
| 2019/0336305 A1 | 11/2019 | Joly et al. | |
| 2019/0343654 A1 | 11/2019 | Laurence et al. | |
| 2019/0343655 A1 | 11/2019 | Bruffey et al. | |
| 2019/0343657 A1 | 11/2019 | Duffield et al. | |
| 2019/0358049 A1 | 11/2019 | Faulhaber | |
| 2019/0374345 A1 | 12/2019 | Thibodeau | |
| 2019/0388231 A1 | 12/2019 | Biedermann et al. | |
| 2019/0388232 A1 | 12/2019 | Purcell et al. | |
| 2019/0388238 A1 | 12/2019 | Lechmann et al. | |
| 2020/0000606 A1 | 1/2020 | Grotz et al. | |
| 2020/0000607 A1 | 1/2020 | To et al. | |
| 2020/0008951 A1 | 1/2020 | Mcclintock et al. | |
| 2020/0008955 A1 | 1/2020 | Ashleigh et al. | |
| 2020/0015986 A1 | 1/2020 | Sack | |
| 2020/0030110 A1 | 1/2020 | Sharabani et al. | |
| 2020/0046514 A1 | 2/2020 | Gilbride et al. | |
| 2020/0046515 A1 | 2/2020 | To et al. | |
| 2020/0046516 A1 | 2/2020 | Curran et al. | |
| 2020/0046517 A1 | 2/2020 | Perloff et al. | |
| 2020/0054455 A1 | 2/2020 | Renani | |
| 2020/0054461 A1 | 2/2020 | Marrocco et al. | |
| 2020/0054463 A1 | 2/2020 | Himmelberger et al. | |
| 2020/0069435 A1 | 3/2020 | Eastlack et al. | |
| 2020/0078190 A1 | 3/2020 | Rogers et al. | |
| 2020/0085586 A1 | 3/2020 | Ludwig et al. | |
| 2020/0093603 A1 | 3/2020 | Manwill et al. | |
| 2020/0093607 A1 | 3/2020 | Davenport et al. | |
| 2020/0093609 A1 | 3/2020 | Shoshtaev | |
| 2020/0100905 A1 | 4/2020 | Sharifi-Mehr et al. | |
| 2020/0107938 A1 | 4/2020 | Faulhaber | |
| 2020/0113708 A1 | 4/2020 | Dinville et al. | |
| 2020/0121471 A1 | 4/2020 | Sharifi-Mehr et al. | |
| 2020/0129306 A1 | 4/2020 | Miller et al. | |

(56) References Cited

U.S. PATENT DOCUMENTS

| | | |
|---|---|---|
| 2020/0129307 A1 | 4/2020 | Hunziker et al. |
| 2020/0138588 A1 | 5/2020 | Lorio |
| 2020/0138594 A1 | 5/2020 | Renganath et al. |
| 2020/0138595 A1 | 5/2020 | Shoshtaev et al. |
| 2020/0138600 A1 | 5/2020 | Weiman et al. |
| 2020/0146840 A1 | 5/2020 | Black et al. |
| 2020/0146843 A1 | 5/2020 | Faulhaber |
| 2020/0170806 A1 | 6/2020 | Ashleigh et al. |
| 2020/0179135 A1 | 6/2020 | Castro |
| 2020/0188128 A1 | 6/2020 | Sack |
| 2020/0188131 A1 | 6/2020 | Mcluen et al. |
| 2020/0205992 A1 | 7/2020 | Bernard et al. |
| 2020/0205993 A1 | 7/2020 | Davenport et al. |
| 2020/0214851 A1 | 7/2020 | Kalhorn et al. |
| 2020/0222202 A1 | 7/2020 | Kuyler et al. |
| 2020/0229936 A1 | 7/2020 | Milz et al. |
| 2020/0229944 A1 | 7/2020 | Suh et al. |
| 2020/0237521 A1 | 7/2020 | Siegal et al. |
| 2020/0237525 A1 | 7/2020 | Weiman et al. |
| 2020/0246159 A1 | 8/2020 | Suh et al. |
| 2020/0253744 A1 | 8/2020 | Saidha et al. |
| 2020/0253746 A1 | 8/2020 | Duffield et al. |
| 2020/0253748 A1 | 8/2020 | Mcluen et al. |
| 2020/0261236 A1 | 8/2020 | Prevost et al. |
| 2020/0261238 A1 | 8/2020 | Robinson |
| 2020/0261241 A1 | 8/2020 | Robinson |
| 2020/0268524 A1 | 8/2020 | Glerum et al. |
| 2020/0276028 A1 | 9/2020 | Blain et al. |
| 2020/0281739 A1 | 9/2020 | Jimenez et al. |
| 2020/0281741 A1 | 9/2020 | Grotz |
| 2020/0289289 A1 | 9/2020 | Shulock et al. |
| 2020/0297506 A1 | 9/2020 | Olmos et al. |
| 2020/0297507 A1 | 9/2020 | Iott et al. |
| 2020/0297510 A1 | 9/2020 | Woodruff |
| 2020/0297511 A1 | 9/2020 | Gray et al. |
| 2020/0315679 A1 | 10/2020 | Vrionis et al. |
| 2020/0315811 A1 | 10/2020 | Cryder et al. |
| 2020/0323643 A1 | 10/2020 | Glerum et al. |
| 2020/0330239 A1 | 10/2020 | Davenport et al. |
| 2020/0330240 A1 | 10/2020 | Greenhalgh et al. |
| 2020/0330241 A1 | 10/2020 | Blain et al. |
| 2020/0337854 A1 | 10/2020 | Schmura et al. |
| 2020/0337862 A1 | 10/2020 | Baker et al. |
| 2020/0345511 A1 | 11/2020 | Daffinson et al. |
| 2020/0345512 A1 | 11/2020 | Zakelj |
| 2020/0345513 A1 | 11/2020 | Glerum et al. |
| 2020/0352730 A1 | 11/2020 | Bell et al. |
| 2020/0352732 A1 | 11/2020 | To et al. |
| 2020/0352738 A1 | 11/2020 | Berry |
| 2020/0352740 A1 | 11/2020 | Vazifehdan et al. |
| 2020/0360151 A1 | 11/2020 | Kuyler et al. |
| 2020/0360152 A1 | 11/2020 | Kim et al. |
| 2020/0360153 A1 | 11/2020 | Weiman et al. |
| 2020/0360156 A1 | 11/2020 | Knapp et al. |
| 2020/0368034 A1 | 11/2020 | Etminan |
| 2020/0368035 A1 | 11/2020 | Gilbride et al. |
| 2020/0375751 A1 | 12/2020 | Dinville et al. |
| 2020/0375752 A1 | 12/2020 | Ashleigh et al. |
| 2020/0375753 A1 | 12/2020 | Mclaughlin et al. |
| 2020/0375755 A1 | 12/2020 | Cain |
| 2020/0383798 A1 | 12/2020 | Butler et al. |
| 2020/0383799 A1 | 12/2020 | Cain |
| 2020/0390565 A1 | 12/2020 | Jimenez et al. |
| 2020/0397593 A1 | 12/2020 | Davenport et al. |
| 2020/0405497 A1 | 12/2020 | Olmos et al. |
| 2020/0405499 A1 | 12/2020 | Gerbec et al. |
| 2020/0405500 A1 | 12/2020 | Marden et al. |
| 2021/0000160 A1 | 1/2021 | Olmos et al. |
| 2021/0000610 A1 | 1/2021 | Rogers et al. |
| 2021/0007860 A1 | 1/2021 | Glerum et al. |
| 2021/0015627 A1 | 1/2021 | Weiman et al. |
| 2021/0015631 A1 | 1/2021 | Davenport et al. |
| 2021/0022884 A1 | 1/2021 | Oglaza et al. |
| 2021/0030555 A1 | 2/2021 | Weiman et al. |
| 2021/0030556 A1 | 2/2021 | Perrow |
| 2021/0030557 A1 | 2/2021 | Robinson |
| 2021/0030560 A1 | 2/2021 | Abu-Mulaweh et al. |
| 2021/0030561 A1 | 2/2021 | Gleason |
| 2021/0038406 A1 | 2/2021 | Pimenta et al. |
| 2021/0052395 A1 | 2/2021 | Iott et al. |
| 2021/0059839 A1* | 3/2021 | Hessler ............... A61F 2/4611 |
| 2021/0068959 A1 | 3/2021 | Mcluen et al. |
| 2021/0068973 A1 | 3/2021 | Mcluen et al. |
| 2021/0068974 A1 | 3/2021 | Cowan et al. |
| 2021/0068976 A1 | 3/2021 | Predick et al. |
| 2021/0068977 A1 | 3/2021 | Faulhaber |
| 2021/0068982 A1 | 3/2021 | Carnes et al. |
| 2021/0069584 A1 | 3/2021 | Deridder et al. |
| 2021/0077157 A1 | 3/2021 | Bosio et al. |
| 2021/0077272 A1 | 3/2021 | Eisen et al. |
| 2021/0077273 A1 | 3/2021 | Sharabani et al. |
| 2021/0077274 A1 | 3/2021 | Robie |
| 2021/0085485 A1 | 3/2021 | Reimhofer et al. |
| 2021/0085486 A1 | 3/2021 | Burrows-Ownbey et al. |
| 2021/0093463 A1 | 4/2021 | Eisen et al. |
| 2021/0093467 A1 | 4/2021 | Adamo et al. |
| 2021/0106430 A1 | 4/2021 | Mermuys et al. |
| 2021/0106434 A1 | 4/2021 | Alheidt et al. |
| 2021/0113347 A1 | 4/2021 | Fessler et al. |
| 2021/0113348 A1 | 4/2021 | Lopez |
| 2021/0113349 A1 | 4/2021 | Weiman et al. |
| 2021/0113350 A1 | 4/2021 | Adamo et al. |
| 2021/0121299 A1 | 4/2021 | Hyder |
| 2021/0121300 A1 | 4/2021 | Weiman et al. |
| 2021/0128315 A1 | 5/2021 | Predick |
| 2021/0137685 A1 | 5/2021 | Kahmer et al. |
| 2021/0137697 A1 | 5/2021 | Weiman |
| 2021/0137699 A1 | 5/2021 | Jang et al. |
| 2021/0145600 A1 | 5/2021 | Sharifi-Mehr et al. |
| 2021/0145607 A1 | 5/2021 | Kuyler et al. |
| 2021/0154021 A1 | 5/2021 | Bae et al. |
| 2021/0161678 A1 | 6/2021 | Dewey et al. |
| 2021/0161682 A1 | 6/2021 | O'Neil et al. |
| 2021/0169656 A1 | 6/2021 | Hawkins et al. |
| 2021/0169659 A1 | 6/2021 | Grim et al. |
| 2021/0177618 A1 | 6/2021 | Branch et al. |
| 2021/0177619 A1 | 6/2021 | Voellmicke et al. |
| 2021/0186706 A1 | 6/2021 | Spitler et al. |

FOREIGN PATENT DOCUMENTS

| | | |
|---|---|---|
| DE | 102013102955 B4 | 7/2017 |
| DE | 202017105466 U1 | 9/2017 |
| DE | 102018206693 B3 | 2/2019 |
| DE | 102015101675 B4 | 3/2019 |
| EP | 0977529 B1 | 2/2003 |
| EP | 1001722 B1 | 10/2003 |
| EP | 1014899 B1 | 8/2004 |
| EP | 1532949 B1 | 7/2007 |
| EP | 1698305 B1 | 8/2007 |
| EP | 1290985 B1 | 4/2008 |
| EP | 1925272 B1 | 1/2010 |
| EP | 1843723 B1 | 3/2010 |
| EP | 1372540 B1 | 11/2010 |
| EP | 1706075 B1 | 1/2011 |
| EP | 1903994 B9 | 6/2011 |
| EP | 1385457 B1 | 10/2011 |
| EP | 1793768 B1 | 11/2011 |
| EP | 2157938 B1 | 2/2012 |
| EP | 1699389 B1 | 4/2012 |
| EP | 1718216 B1 | 4/2012 |
| EP | 2226039 B1 | 11/2015 |
| EP | 2967659 A1 | 1/2016 |
| EP | 2967906 A1 | 1/2016 |
| EP | 2719360 B1 | 5/2016 |
| EP | 3016617 A2 | 5/2016 |
| EP | 3031424 A1 | 6/2016 |
| EP | 2729092 B1 | 9/2016 |
| EP | 2508150 B1 | 10/2016 |
| EP | 2931181 B1 | 10/2016 |
| EP | 3076903 A1 | 10/2016 |
| EP | 3169279 A1 | 5/2017 |
| EP | 3213720 A1 | 9/2017 |
| EP | 2967917 B1 | 11/2017 |

(56) References Cited

FOREIGN PATENT DOCUMENTS

| | | |
|---|---|---|
| EP | 3247315 A1 | 11/2017 |
| EP | 3263072 A1 | 1/2018 |
| EP | 2654627 B1 | 3/2018 |
| EP | 3294223 A1 | 3/2018 |
| EP | 3315095 A1 | 5/2018 |
| EP | 3344194 A1 | 7/2018 |
| EP | 3345575 A1 | 7/2018 |
| EP | 2793760 B1 | 8/2018 |
| EP | 3362000 A1 | 8/2018 |
| EP | 3366263 A1 | 8/2018 |
| EP | 2904991 B1 | 10/2018 |
| EP | 3397212 A1 | 11/2018 |
| EP | 2051660 B1 | 2/2019 |
| EP | 2735286 B1 | 3/2019 |
| EP | 2747714 B1 | 4/2019 |
| EP | 3474782 A2 | 5/2019 |
| EP | 3474783 A2 | 5/2019 |
| EP | 3474784 A2 | 5/2019 |
| EP | 2961352 B1 | 6/2019 |
| EP | 2611395 B1 | 7/2019 |
| EP | 3240506 B1 | 7/2019 |
| EP | 3247295 B1 | 8/2019 |
| EP | 3253335 B1 | 8/2019 |
| EP | 2958525 B1 | 9/2019 |
| EP | 3534811 A1 | 9/2019 |
| EP | 2838454 B1 | 10/2019 |
| EP | 3177233 B1 | 10/2019 |
| EP | 2764851 B1 | 11/2019 |
| EP | 3324895 B1 | 11/2019 |
| EP | 3568109 A1 | 11/2019 |
| EP | 3621554 A1 | 3/2020 |
| EP | 3622920 A1 | 3/2020 |
| EP | 3638157 A1 | 4/2020 |
| EP | 2967901 B1 | 5/2020 |
| EP | 3435924 B1 | 5/2020 |
| EP | 3310304 B1 | 9/2020 |
| EP | 3384877 B1 | 10/2020 |
| EP | 3727207 A1 | 10/2020 |
| EP | 3742990 A1 | 12/2020 |
| EP | 3818965 A1 | 5/2021 |
| ES | 2361099 B1 | 5/2012 |
| FR | 2763836 B1 | 7/1999 |
| FR | 2866228 B1 | 9/2006 |
| FR | 2981261 B1 | 11/2013 |
| FR | 3058043 B1 | 11/2020 |
| WO | 2006134262 A1 | 12/2006 |
| WO | WO2014144696 A1 | 9/2014 |
| WO | WO2016127139 A1 | 8/2016 |
| WO | WO2019023251 A1 | 1/2019 |
| WO | WO2019079090 A1 | 4/2019 |
| WO | WO2019161393 A1 | 8/2019 |
| WO | WO2019165152 A1 | 8/2019 |
| WO | WO2019165157 A1 | 8/2019 |
| WO | WO2019169036 A1 | 9/2019 |
| WO | WO2019170739 A1 | 9/2019 |
| WO | WO2019170744 A1 | 9/2019 |
| WO | WO2019191745 A1 | 10/2019 |
| WO | WO2019246441 A1 | 12/2019 |
| WO | WO2020084158 A1 | 4/2020 |
| WO | WO2020095745 A1 | 5/2020 |
| WO | WO2020104788 A1 | 5/2020 |
| WO | WO2020104790 A1 | 5/2020 |
| WO | WO2020104792 A1 | 5/2020 |
| WO | WO2020209722 A1 | 10/2020 |
| WO | WO2020251943 A1 | 12/2020 |

OTHER PUBLICATIONS

US 11,026,806 B2, 06/2021, Olmos et al. (withdrawn)
Extended European Search Report for corresponding EP Application No. 21186249.5 dated Jan. 17, 2022 (7 pages).
Extended European Search Report for corresponding EP Application No. 21186250.3 dated Jan. 31, 2022 (13 pages).
Extended European Search Report for corresponding EP Application No. 21186251.1 dated Jan. 28, 2022 (11 pages).
Extended European Search Report for corresponding EP Application No. 21186272.7 dated Mar. 2, 2022 (9 pages).
International Search Report and Written Opinion for corresponding PCT Application No. PCT/EP2022/069885 mailed Oct. 19, 2022 (9 pages).
International Search Report and Written Opinion for corresponding PCT Application No. PCT/EP2022/069886 mailed Nov. 3, 2022 (13 pages).
International Search Report and Written Opinion for corresponding PCT Application No. PCT/EP2022069888 mailed Nov. 8, 2022 (13 pages).
International Search Report and Written Opinion for corresponding PCT Application No. PCT/EP2022069906 mailed Nov. 7, 2022 (13 pages).

* cited by examiner

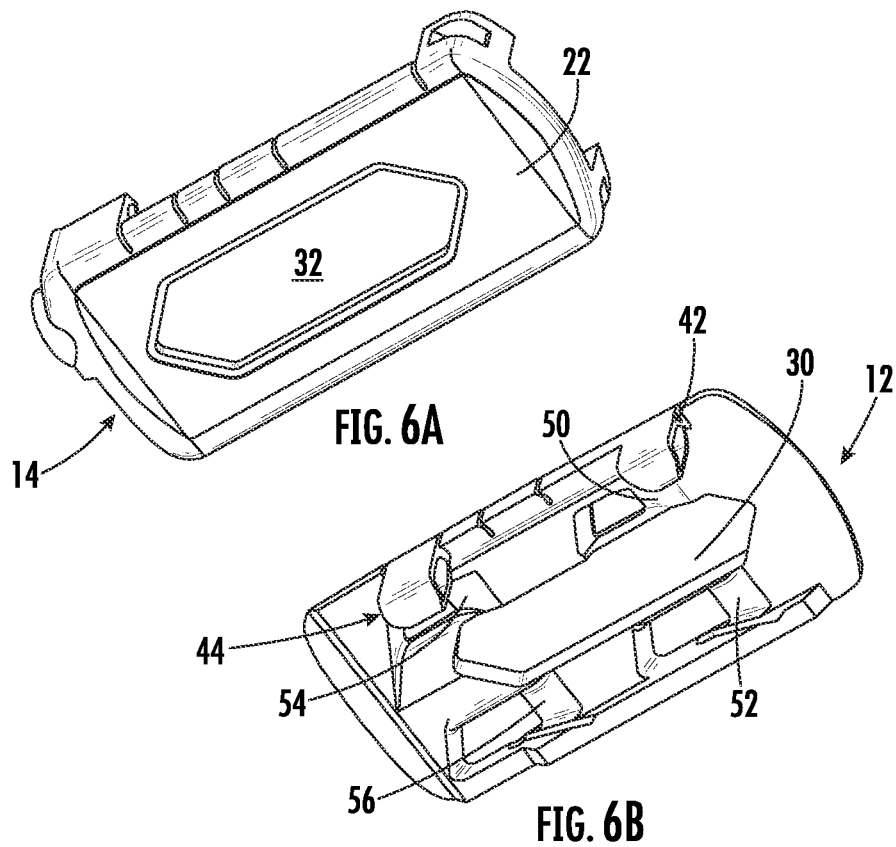
FIG. 6A
FIG. 6B
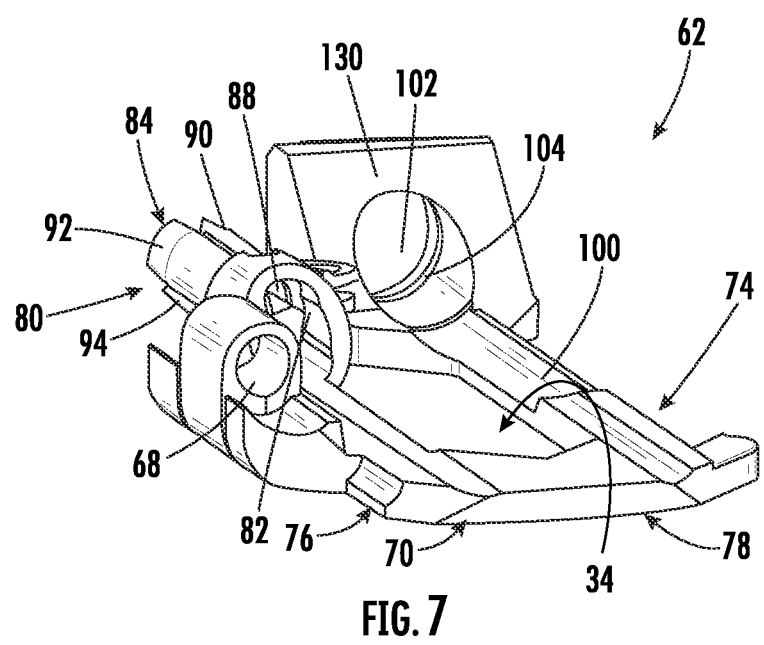
FIG. 7

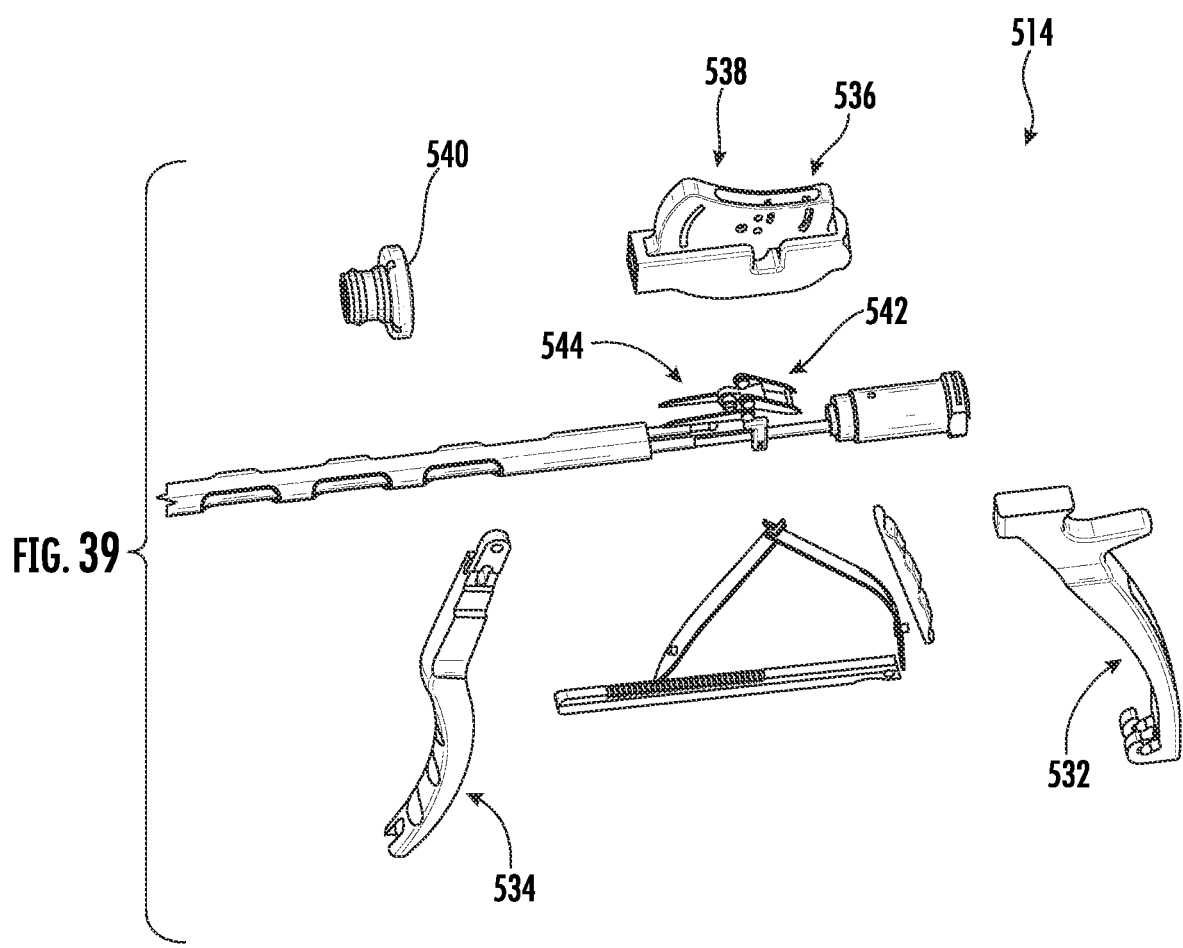

ADJUSTABLE SPINAL IMPLANTS, ASSOCIATED INSTRUMENTS AND METHODS

CROSS-REFERENCE TO RELATED APPLICATIONS

This application claims the benefit of U.S. Provisional Application Ser. Nos. 63/222,482, 63/222,498 and 63/222,506, all of which were filed Jul. 16, 2021, and European Patent Application Nos. 21186249.5, 21186250.3 and 21186251.1, all of which were filed Jul. 16, 2021, the complete disclosures of which are incorporated herein by reference in their entirety for all purposes.

FIELD

The present disclosure relates to implantable devices for stabilizing and/or promoting the fusion of adjacent bony structures and, more particularly, to implantable spinal fusion cages that can adjust in height and angle to accommodate spacing constraints and/or address lordosis within an intervertebral space.

BACKGROUND

Implantable spinal devices can be used to treat a variety of spinal disorders, including degenerative disc disease. For example, in one type of spinal disorder, the intervertebral disc has deteriorated or become damaged due to acute injury or trauma, disc disease or simply the natural aging process. The standard treatment today may involve surgical removal of a portion, or all, of the diseased or damaged intervertebral disc in a process known as a partial or total discectomy, respectively. The discectomy is often followed by the insertion of a cage or spacer to stabilize this weakened or damaged spinal region. This cage or spacer serves to reduce or inhibit mobility in the treated area, in order to avoid further progression of the damage and/or to reduce or alleviate pain caused by the damage or injury. Moreover, these types of cages or spacers serve as mechanical or structural scaffolds to restore and maintain normal disc height, and in some cases, can also provide a space for inserting bone graft material to promote bony fusion between the adjacent vertebrae.

One of the current challenges of these types of procedures is the very limited working space afforded the surgeon to manipulate and insert the cage into the intervertebral area to be treated. Access to the intervertebral space requires navigation around retracted adjacent vessels and tissues such as the aorta, vena cava, dura and nerve roots, leaving a very narrow pathway for access. The opening to the intradiscal space itself is also relatively small. Hence, there are physical limitations on the actual size of the cage that can be inserted without significantly disrupting the surrounding tissue or the vertebral bodies themselves.

Further complicating the issue is the fact that the vertebral bodies are not positioned parallel to one another in a normal spine. There is a natural curvature to the spine due to the angular relationship of the vertebral bodies relative to one another. The ideal cage must be able to accommodate this angular relationship of the vertebral bodies, or else the cage will not sit properly when inside the intervertebral space. An improperly fitted cage would either become dislodged or migrate out of position, and lose effectiveness over time, or worse, further damage the already weakened area.

Another problem is that, In order to insert the cage between the adjacent vertebra, at least a portion, if not all, of the intervertebral disc is removed to make room for the cage. The removal of the entire disc or disc portion disrupts the normal lordotic or kyphotic curvature of the spine. Traditional fusion cages do not attempt to correct this curvature, and over time as the vertebrae settle around the implanted cages, kyphotic deformity results.

It is therefore desirable to provide implantable spinal devices that have the ability to maintain and restore the normal anatomy of the fused spine segment. It is particularly desirable to provide interbody cages or spacers that not only have the mechanical strength or structural integrity to restore disc height or vertebral alignment to the spinal segment to be treated, but also can easily pass through the narrow access pathway into the intervertebral space, and accommodate the angular constraints of this space and/or correct the lordotic or kyphotic curvature created by removal of the disc.

SUMMARY

The present disclosure provides spinal systems, implantable spinal devices and instruments for implanting the spinal systems or devices. The present disclosure further provides methods for adjusting the height and lordosis angles of the spinal devices and methods for implanting such devices.

In one aspect, an adjustable spinal fusion device includes an upper plate having an outer surface for placement against a first vertebral body and a lower plate having an outer surface for placement against a second vertebral body. The device further includes a first translation member configured to move longitudinally relative to the upper and lower plates to adjust a distance between the upper and lower plates (i.e., the height of the implant); and a second translation member configured to move longitudinally relative to the upper and lower plates to adjust an angle between the upper and lower plates (i.e., the angle of lordosis of the implant). Thus, the device has a first configuration for advancing through a narrow access pathway into the intervertebral space, and a second configuration, wherein the device may be adjusted in height and/or angle to accommodate the angular constraints of this space and/or correct the lordotic or kyphotic curvature.

In embodiments, the upper and lower plates each have proximal and distal ends and first and second sides extending from the proximal end to the distal end. The second translation member is configured to adjust the angle between the first and second sides of the plates. This allows the upper plate to rotate relative to the lower plate around an axis substantially parallel to the longitudinal axis of the device.

In embodiments, the device comprises a hinge on one of the first and second sides for rotatably coupling the upper plate to the lower plate. The hinge may include a rod extending substantially longitudinally along one side of the plates. The upper plate may comprise one or more coupling elements, such as knuckles or the like, rotatably coupled around the rod for allowing rotation of the upper plate relative to the lower plate.

In embodiments, longitudinal movement of the first translation member causes longitudinal movement of the second translation member to adjust the distance between the upper and lower plates and longitudinal movement of the second translation member relative to the first translation member adjusts the angle between the upper and lower plates. This allows for independent adjustment of the angle and/or height of the device.

In embodiments, the first translation member comprises a first bore with a mating feature for cooperating with a first actuator shaft of a surgical instrument to move the first translation member in the longitudinal direction. The second translation member comprises a second bore with a mating feature for cooperating with a second actuator shaft of a surgical instrument to move the second translation member in the longitudinal direction.

In embodiments, the upper plate comprises first and second proximal ramps and first and second distal ramps extending towards the lower plate each in the proximal direction. The first translation member comprises a movable wedge with first and second upper proximal angled surfaces for cooperating with the first and second proximal ramps of the upper plate and first and second distal angled surfaces for cooperating with the first and second distal ramps of the upper plate.

In embodiments, the second translation member comprises a second movable wedge with at least one angled surface and the first translation member includes at least one angle surface or ramp positioned to cooperate with the second movable wedge of the second translation member. The second movable wedge and the ramp of the first translation member are positioned on the first side of the plates such that longitudinal movement of the second translation member causes the first side of the upper plate to move towards or away from the first side of the lower plate.

In embodiments, the first and second bores of the translation members each include a mating feature for securing the translation members to the actuator shafts. In one such embodiment, the mating feature comprises at least one recess formed within the bores for receiving at least one projection on the first and second actuator shafts. Rotation of the actuator shafts within the bores causes the projection(s) to rotate into the recess(es), thereby securing the actuator shafts to the translation members.

In embodiments, the device further comprises a mechanism for providing discrete steps that correspond to incremental changes in angle and/or height of the plates. In one such embodiment, the first and second ratchet shafts extend into a distal portion of the first and second bores of the translation members. The ratchet shafts comprise external projections extending along the shafts, such as teeth, threads or the like. The distal portion of the first and second bores each comprise two or more elongate members (e.g., fingers) separated from each other and configured to mate with the external projections on the ratchet shafts. This cooperation between the ratchet shafts and the fingers inhibits reverse (i.e., distal) movement of the translation members and creates discrete "steps" in the proximal movement of the translation members relative to the upper and lower plates. These steps correspond to height and angle adjustments or increments of the endplates.

In certain embodiments, the elongate members generally press inward against the projections of the ratchet shafts to prevent reverse movement of the translation members in the distal direction. The elongate members of the first and second bores may be configured to mate with a tapered distal end of the first and second actuator shafts of the instrument such that distal movement of the first and second actuator shafts causes the tapered distal end to engage the projections and urge the fingers laterally outward. This causes the internal ratchets to disengage from the projections such that distal or reverse movement of the translation members is possible.

In embodiments, the device may be part of a system that includes a third plate coupled to, or formed integrally with, a proximal surface of at least one of the upper and lower plates. This third plate includes one or more through-holes for receiving fasteners therethrough. The fasteners may include any suitable device, such as cannulated or uncannulated screws, bolts, nails, anchors or the like. The through-holes are oriented such that the fasteners can be advanced into the first and second vertebral bodies in the direction of, but spaced from, the outer surfaces of the upper and lower plates to secure the device to the vertebral bodies.

In embodiments, the system further includes a locking element coupled to the through-holes of the fixation plate. The locking element is movable from an unlocked position, wherein the fasteners may be passed through the through-holes, and a locked position, wherein the fasteners are secured within the through-holes. In an exemplary embodiment, the locking element comprises a rotatable element and a spring. Rotation of the rotatable element moves the spring into engagement with the through-hole and into the locking position. This prevents the fasteners from backing out or otherwise loosening from the vertebral bodies.

In another aspect, a spinal fusion system comprises an adjustable spinal fusion device having an upper endplate with an outer surface for placement against a first vertebral body and a lower endplate with an outer surface for placement against a second vertebral body. The device includes a first translation member configured to move longitudinally relative to the upper and lower plates to adjust a distance between the upper and lower plates and a second translation member configured to move longitudinally relative to the upper and lower plates to adjust an angle between the upper and lower plates. The system further comprises an instrument having a proximal handle, an elongate shaft and an actuator within the elongate shaft coupled to the proximal handle for moving the first and second translation members longitudinally relative to the upper and lower endplates.

In embodiments, the actuator comprises a first actuator shaft coupled to the first translation member and a second actuator shaft coupled to the second translation member. In one such embodiment, the actuators are laterally spaced from each other in the instrument and coupled to a user interface on the handle. In embodiments, the user interface comprises first and second rotatable knobs coupled to the first and second actuator shafts, respectively, such that rotation of the knobs causes longitudinal movement of the actuator shafts and the translation members.

In embodiments, the upper and lower plates each have proximal and distal ends and first and second sides extending from the proximal end to the distal end. The second translation member is configured to adjust the angle between the first and second sides to allow the upper plate to rotate relative to the lower plate around an axis substantially parallel to the longitudinal axis of the device.

In embodiments, the device comprises a hinge on one of the first and second sides for rotatably coupling the upper plate to the lower plate. The hinge may include a rod extending substantially longitudinally along one side of the plates. The upper plate may comprise one coupling elements, such as knuckles or the like, rotatably coupled around the rod for allowing rotation of the upper plate relative to the lower plate.

In embodiments, longitudinal movement of the first translation member causes longitudinal movement of the second translation member to adjust the distance between the upper and lower plates and longitudinal movement of the second translation member relative to the first translation member adjusts the angle between the upper and lower plates.

In embodiments, the first translation member comprises a first bore with a mating feature for cooperating with a first actuator shaft of a surgical instrument to move the first translation member in the longitudinal direction. The second translation member comprises a second bore with a mating feature for cooperating with a second actuator shaft of a surgical instrument to move the second translation member in the longitudinal direction.

In embodiments, the upper plate comprises first and second proximal ramps and first and second distal ramps extending towards the lower plate each in the proximal direction. The first translation member comprises a movable wedge with first and second upper proximal angled surfaces for cooperating with the first and second proximal ramps of the upper plate and first and second distal angled surfaces for cooperating with the first and second distal ramps of the upper plate.

In embodiments, the second translation member comprises a second movable wedge with at least one angled surface and the first translation member includes at least one angle surface or ramp positioned to cooperate with the second movable wedge of the second translation member. The second movable wedge and the ramp of the first translation member are positioned on the first side of the plates such that longitudinal movement of the second translation causes the first side of the upper plate to move towards or away from the first side of the lower plate.

In embodiments, the first and second bores of the translation members each include a mating feature for securing the translation members to the actuator shafts. In one such embodiment, the mating feature comprises at least one recess formed within the bores for receiving at least projection on the first and second actuator shafts. Rotation of the actuator shafts within the bores causes the projection(s) to rotate into the recess(es), thereby securing the actuator shafts to the translation members.

In embodiments, the device further comprises a mechanism for providing discrete steps that correspond to incremental changes in angle and/or height of the plates. In one such embodiment, the first and second ratchet shafts extending into a distal portion of the first and second bores of the translation members. The ratchet shafts comprise external projections extending along the shafts, such as teeth, threads or the like. The distal portion of the first and second bores each comprise two or more elongate members (e.g., fingers) separated from each other and configured to mate with the external projections on the ratchet shafts. This cooperation between the ratchet shafts and the fingers inhibits reverse (i.e., distal) movement of the translation members and creates discrete "steps" in the proximal movement of the translation members relative to the upper and lower plates. These steps correspond to height and angle adjustments or increments of the endplates.

In certain embodiments, the elongate members generally press inward against the projections of the ratchet shafts to prevent reverse movement of the translation members in the distal direction. The elongate members of the first and second bores may be configured to mate with a tapered distal end of the first and second actuator shafts of the instrument such that distal movement of the first and second actuator shafts causes the tapered distal end to engage the projections and urge the fingers laterally outward. This causes the internal ratchets to disengage from the projections such that distal or reverse movement of the translation members is possible.

In embodiments, the device may be part of a system that includes a third plate coupled to, or formed integrally with, a proximal surface of at least one of the upper and lower plates. This third plate includes one or more through-holes for receiving fasteners therethrough. The fasteners may include any suitable device, such as cannulated or uncannulated screws, bolts, nails, anchors or the like. The through-holes are oriented such that the fasteners can be advanced into the first and second vertebral bodies in the direction of, but spaced from, the outer surfaces of the upper and lower plates to secure the device to the vertebral bodies.

In embodiments, the system further includes a locking element coupled to the through-holes of the fixation plate. The locking element is movable from an unlocked position, wherein the fasteners may be passed through the through-holes, and a locked position, wherein the fasteners are secured within the through-holes. In an exemplary embodiment, the locking element comprises a rotatable element and a spring. Rotation of the rotatable element moves the spring into engagement with the through-hole and into the locking position. This prevents the fasteners from backing out or otherwise loosening from the vertebral bodies.

In another aspect, an adjustable spinal fusion device comprises an upper plate having an outer surface for placement against a first vertebral body, proximal and distal ends and first and second sides extending from the proximal end to the distal end and a lower plate having an outer surface for placement against a second vertebral body, proximal and distal ends and first and second sides extending from the proximal end to the distal end. The device further comprises a hinge on the second sides of the upper and lower plates for rotatably coupling the upper plate to the lower plate and a translation member configured to move longitudinally relative to the upper and lower plates to rotate the upper plate relative to the lower plate and adjust a distance between the first side of the upper plate and the first side of the lower plate.

The hinge may comprise a rod extending in a longitudinal direction along the second sides of the upper and lower plates. The upper plate may comprise one or knuckles or other coupling elements rotatably coupled to the rod. The one or more knuckles may have a hollow interior with a height larger than an outer diameter of the rod to allow the second side of the upper plate to move relative to the second side of the lower endplate.

The device may include a second translation member configured to move longitudinally relative to the upper and lower plates to adjust a height between the upper and lower plates. The second translation member may comprise a knuckle for receiving the rod and at least one angled surface positioned to cooperate with a ramp of the first translation member. The ramp and the angled surface may be positioned on the first side of the plates such that longitudinal movement of the first translation causes the first side of the upper plate to move towards and away from the first side of the lower plate.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIG. 6A is a top view of an upper endplate of the spinal device;

FIG. 6B is a bottom view of the upper endplate;

FIG. 7 is a perspective view of a bottom portion of a height translation member of the spinal device;

FIG. 39 is an exploded view of a proximal portion of the trial implant and instrument of FIG. 38.

DESCRIPTION OF THE EMBODIMENTS

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Figure 1:
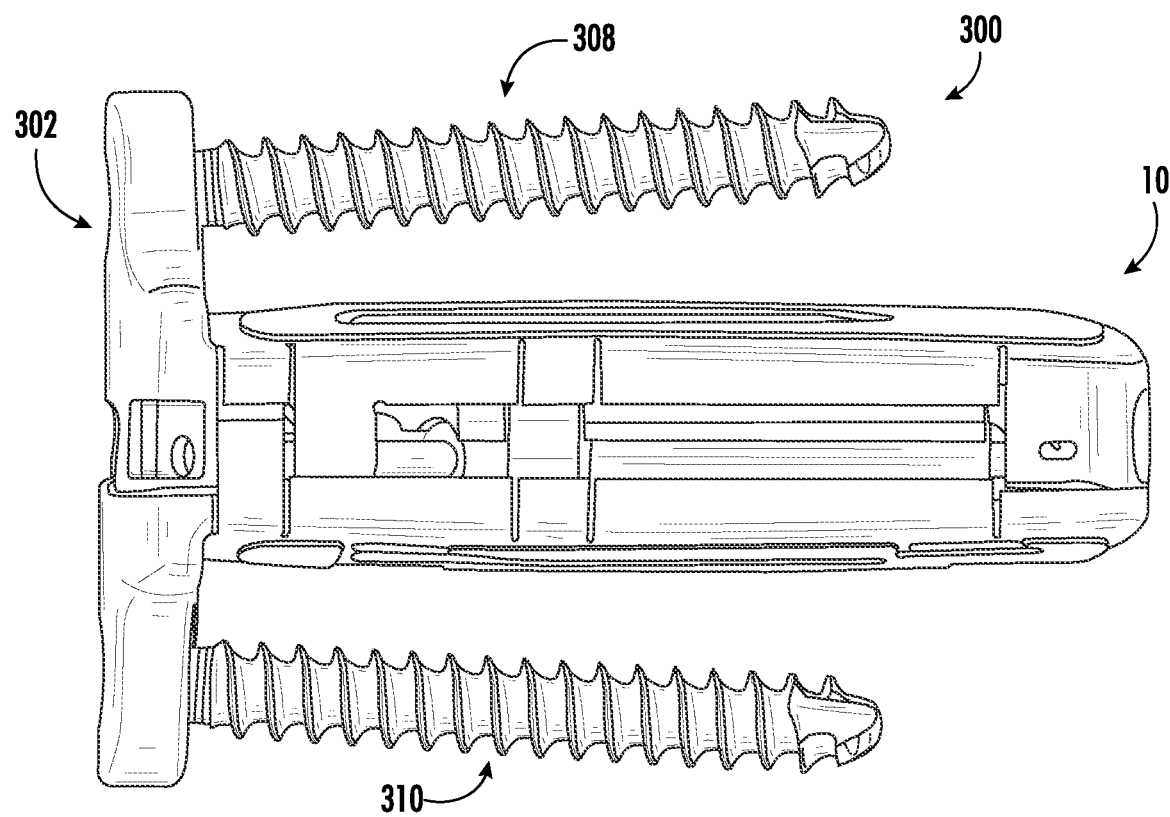
FIG. 1 is a perspective view of an implantable spinal system.
Figure 2A:
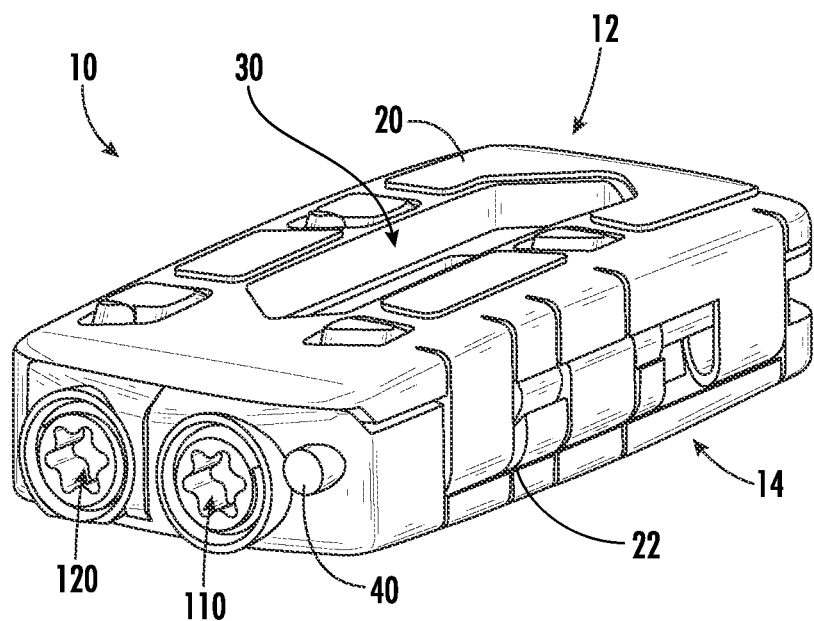
FIG. 2A is a proximal perspective view adjustable spinal device of the system of FIG. 1.
Figure 2B:
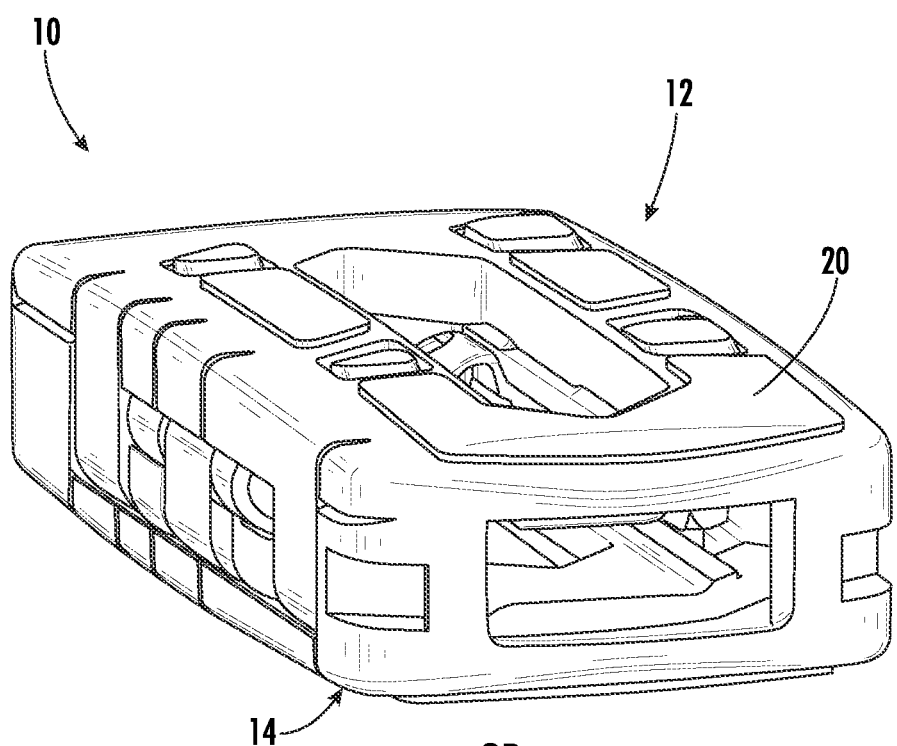
FIG. 2B is a distal perspective view of the spinal device.
Figure 3:
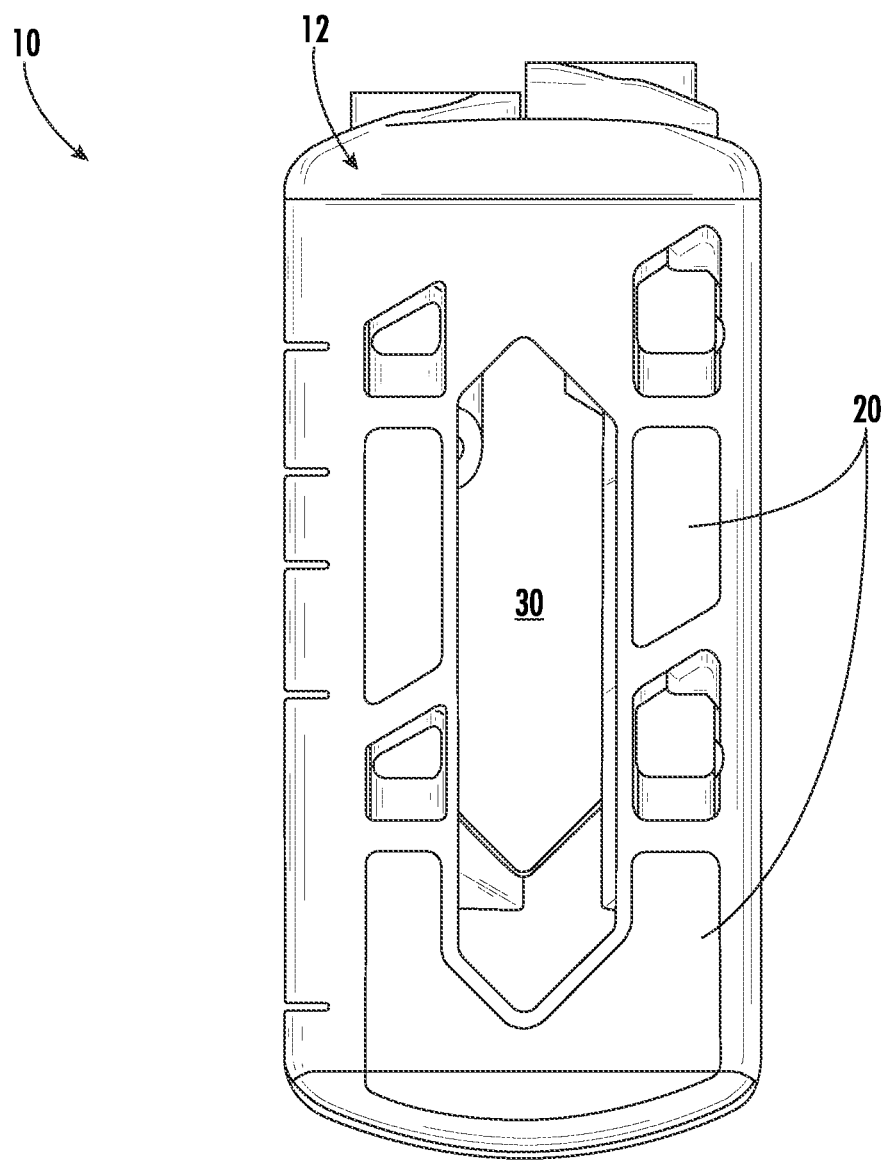
FIG. 3 is a top view of the device.

Referring now to FIG. 1, a spinal system 300 according to the present disclosure is configured for placement between two adjacent vertebral bodies. Spinal system 300 comprises a fixation plate 302 coupled to a spinal implant device 10. Fixation plate 302 includes first and second through-holes 304, 306 (see 28) for receiving first and second fixation devices, or fasteners, 308, 310 that extend on either side of device 10 for fixation to the two vertebral bodies, as discussed in more detail below. In some embodiments, implant 10 is particularly useful for advancement via a direct lateral approach through the psoas muscle (lateral lumbar interbody fusion or LLIF), although it will be recognized that the systems and implants disclosed herein may be employed in a variety of different surgical approaches, such as anterior lumbar interbody fusion (ALIF), posterior lumbar interbody fusion (PLIF) and/or (transforaminal lumbar interbody fusion or TLIF).

Referring now to FIGS. 2-9, spinal implant device 10 includes upper and lower endplates 12, 14, an angle translation member 16 and a height translation member 18. The height and angle translation members 16, 18 are configured to be translated in the longitudinal direction relative to the endplates 12, 14 by first and second shafts 202, 210 of an insertion instrument 200 (see FIGS. 20 and 21). Movement of the translation members 16, 18 in substantially the longitudinal direction changes the height and angle of endplates 12, 14 as discussed in more detail below.

Upper and lower endplates 12, 14 each include an outer surface 20, 22, respectively, for contacting the surface of a vertebral body. Outer surfaces 20, 22 are preferably roughened with a surface treatment that facilitates attachment to the vertebral body. The surface treatment preferably creates a diamond structure (e.g., diamond 20-1.5), although other patterns are contemplated. Upper and lower endplates 12, 14 each include central openings 30, 32 that extend through the entire endplates 12, 14 and, in one embodiment, are substantially aligned with each other. Similarly, height translation member 18, includes a central opening or bore 34 that, in one embodiment, may be substantially aligned with endplate openings 30, 32 (see FIG. 9). These openings create space for the addition of bone graft or other substances into the implant, as well as to allow for bony ingrowth through implant 10.

Figure 16:
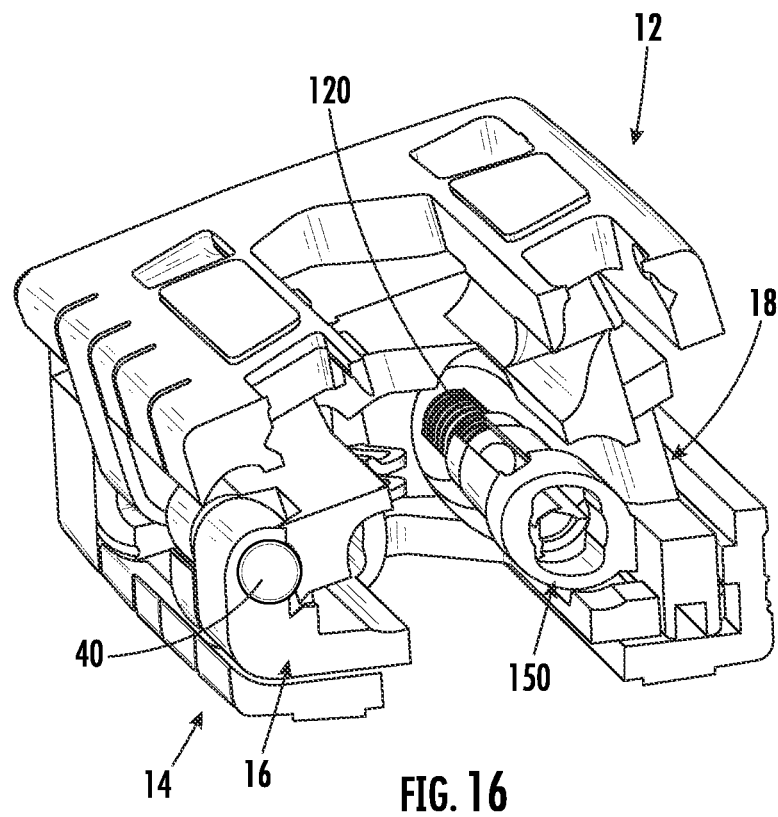
FIG. 16 is another partial cross-sectional view of the spinal device.

Upper and lower endplates 12, 14 each comprises proximal and distal ends 21, 23 and first and second sides 25, 27 extending between proximal and distal ends 21, 23. Endplates 12, 14 are connected to each other via a hinge located along first side 25 of the endplates, which allows upper endplate 12 to rotate relative to lower endplate 14 to increase or decrease the distance between second sides 27 of endplates 12, 14, thereby changing the overall angle of device 10 once it is positioned between the vertebral bodies in the patient (see, for example, FIG. 16).

Figure 4:
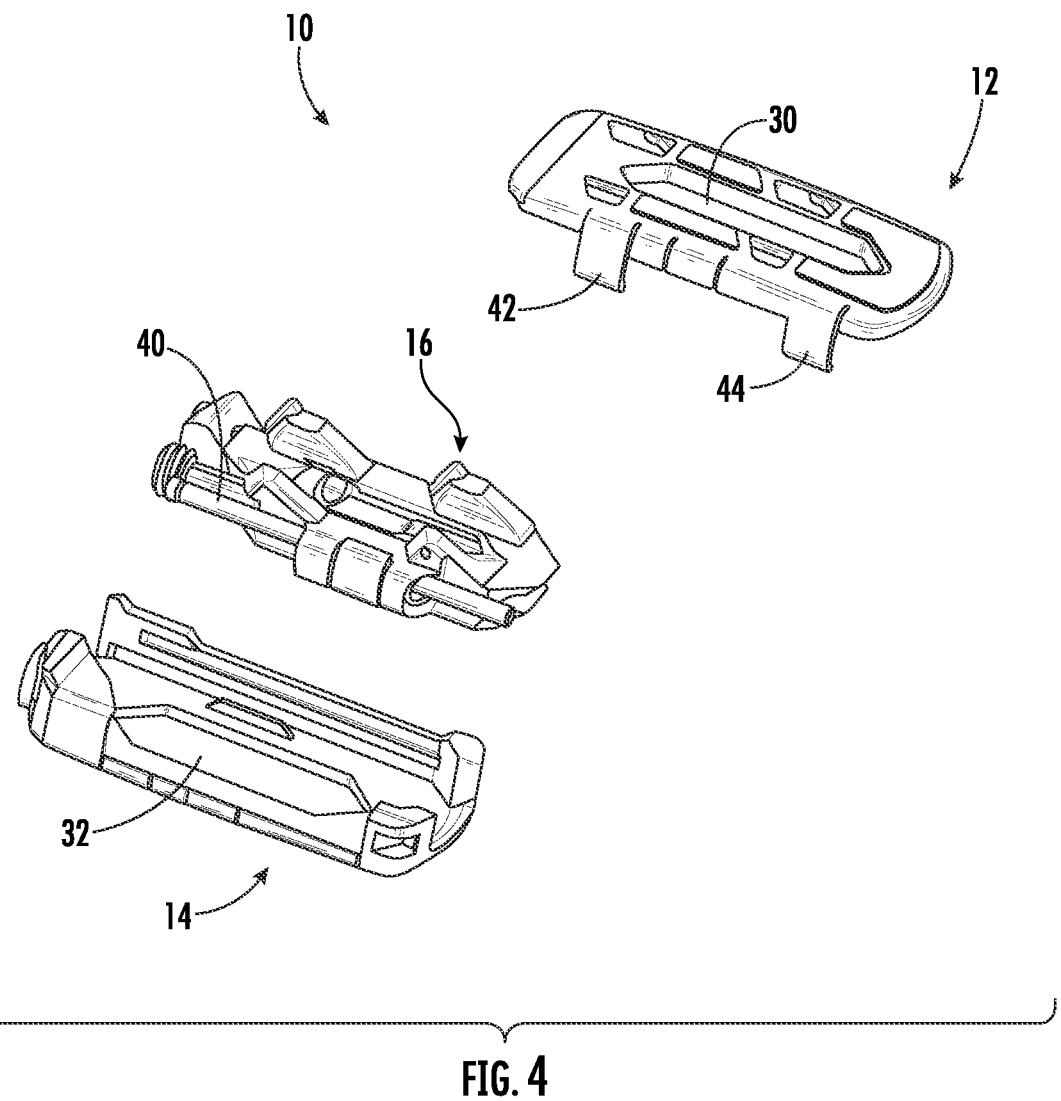
FIG. 4 is a partially exploded view of the device.
Figure 5:
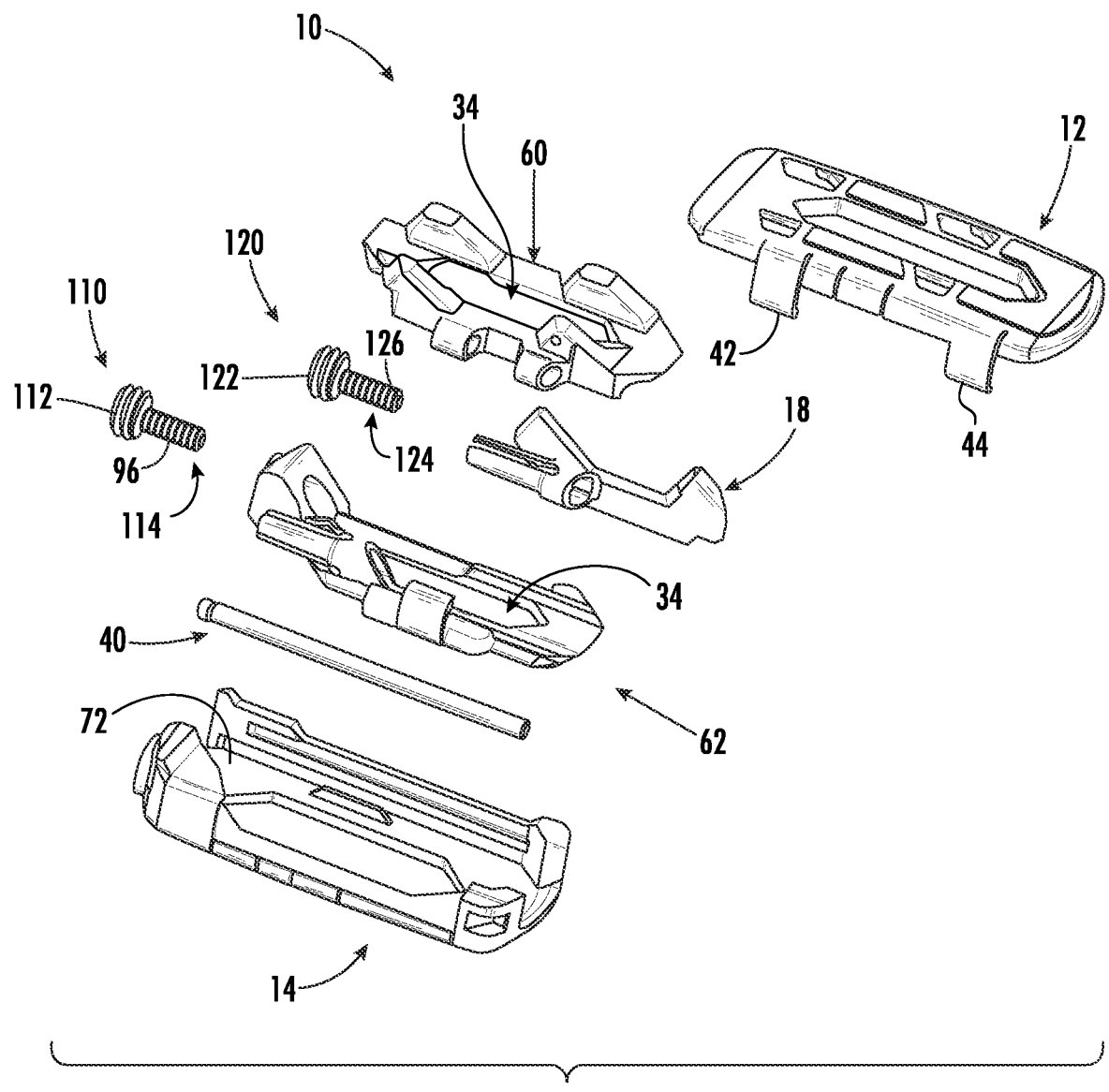
FIG. 5 is a fully exploded view of the device.

Referring now to FIGS. 4 and 5, in certain embodiments the hinge comprises a rod 40 that extends in the longitudinal direction alongside 25 of lower endplate 14 and through first and second coupling elements 42, 44 in upper endplate 12 (see FIG. 4). Coupler elements 42, 44 may comprise any suitable component that allows for rotation around rod 40, such as knuckles or the like. Knuckles 42, 44 are preferably U-shaped substantially hollow components extending downward from side 25 of upper endplate 12. Knuckles 42, 44 allow rotation of upper endplate 12 relative to lower endplate 14 around the longitudinal axis defined by rod 40. In addition, the hollow interiors of knuckles 42, 44 preferably have a larger height than the outer diameter of rod 40 to allow the upper endplate 12 to move vertically relative to the lower endplate 14 while still retaining rod 40 within knuckles 42, 44, as discussed below.

As shown in FIG. 6B, upper endplate 12 includes: (1) first and second distal sloped surfaces or ramps 50, 52 that are laterally spaced from each other near either side of the upper endplate 12 and extend towards the lower endplate 14 in the proximal direction; and (2) third and fourth proximal sloped surfaces or ramps 54, 56 that are laterally spaced from each other near either side of upper endplate 12 and also extend towards the lower endplate 14 in the proximal direction. These ramps interact with wedges on the height translation member 16 to provide height adjustment of the implant.

In an alternative embodiment, upper endplate 12 may include a single distal ramp and/or a single proximal ramp that extends laterally across a central portion of the endplate 12. Alternatively, endplate 12 may include more than two distal or proximal ramps.

Figure 9:
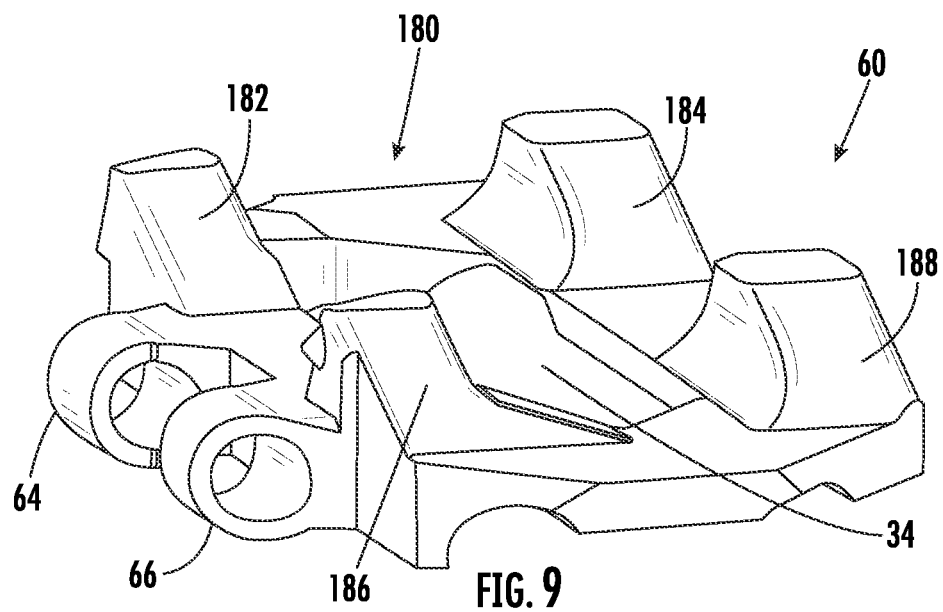
FIG. 9 is a perspective view of a top portion of the height translation member.

As shown in FIGS. 7 and 9, height translation member 16 includes an upper portion 60 and a lower portion 62 that may be integral with each other, coupled to each other or completely separate components from each other. Upper portion 60 includes first and second hinge cylinders 64, 66 on one of the sides of the upper portion 60 spaced longitudinally from each other. Hinge cylinders 64, 66 each have a hollow lumen configured to receive rod 40 of the hinge, which extends through the lumens of first and second cylinders 64, 66. These cylinders 64, 66 couple the upper portion 60 of the height translation member 16 to the lower endplate 14 and allow this portion to slide longitudinally relative to the endplates along the rod 40. The lower portion 62 also includes a hinge cylinder 68 on one side of lower portion 62 that is positioned between the first and second cylinders 64, 66 of upper portion 60. This cylinder 68 has a hollow lumen that receives rod 40 of the hinge, thereby coupling lower portion 60 to lower endplate 14 and allowing it to slide longitudinally along the rod 40 relative to the endplates.

Upper portion 60 of the height translation member 16 comprises a main body 180 with: (1) first and second distal wedges 182, 184 for engaging with distal ramps 50, 52 on the upper endplate 12 and (2) first and second proximal wedges 186, 188 for engaging with proximal ramps 54, 56 of the upper endplate. Longitudinal movement of translation member 16 causes the upper endplate to move towards and away from the lower endplate. In an alternative embodiment, distal translation member 16 may include a single distal ramp and/or a single proximal ramp that extends laterally across a central portion of the translation member 16. Alternatively, translation member 16 may include more than two distal or proximal ramps.

Figure 22:
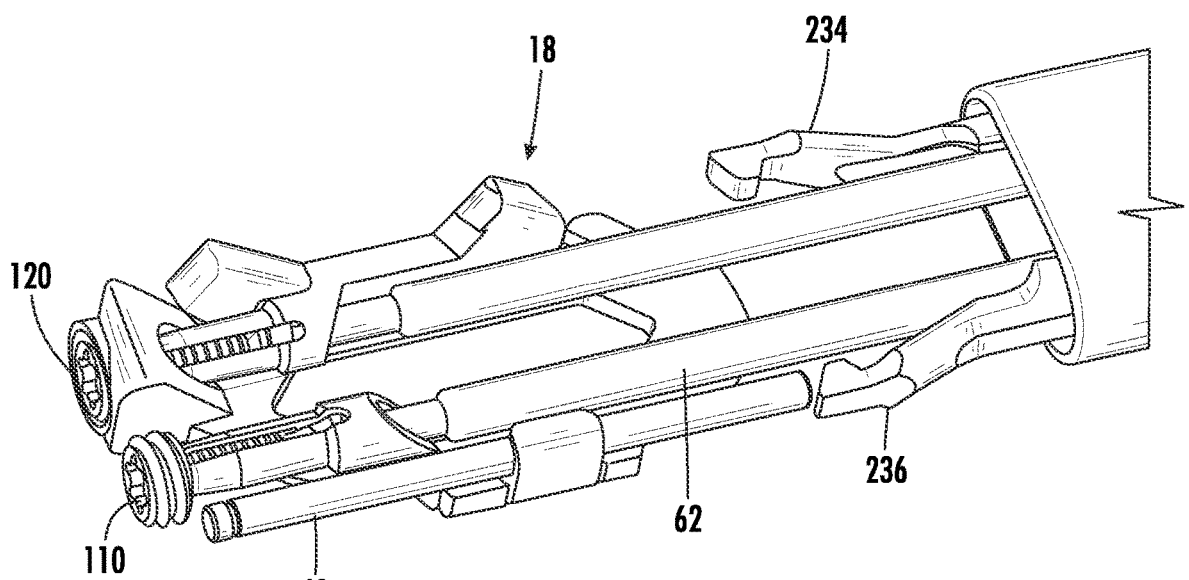
FIG. 22 is a cut-a-way view of a portion of the spinal device and the distal portion of the instrument.

As shown in FIG. 7, lower portion 62 of height translation member 16 comprises a frame 70 generally positioned on, or adjacent to, an upper surface 72 of lower endplate 14 (see FIG. 5). Frame 70 comprises first and second lateral elements 74, 76 that extend longitudinally on either side of central opening 34 of lower portion 62. Lateral elements 74, 76 are coupled to each other by a proximal base portion 78. The first lateral element 76 comprises a bore 80 with a proximal opening 82 for receiving a first shaft actuator 202 on the insertion instrument 200 and a distal opening 84 for receiving a first ratchet shaft 110 having a threaded head or attachment end (see FIG. 22).

The proximal portion of bore 80 includes a mating feature for securing lower portion 62 of height translation member 16 to first shaft actuator shaft 202. In one embodiment, this mating feature comprises one or more recesses (not shown) formed within bore 80 and extending laterally inward from the central axis of the bore 80. These recesses are designed to accommodate one or more projections 204, 206 on the distal end of first instrument actuator shaft 202 (see FIG. 23). These projections 204, 206 can be rotated into the recesses to lock actuator shaft 202 to lower portion 62 of height translation member 16. Once this occurs, longitudinal translation of actuator shaft 202 causes longitudinal translation of lower portion 62 of height translation member 16.

First ratchet shaft 110 includes a threaded head 112 and a shaft 114 with a series of external projections, such as teeth 96, extending therefrom (see FIG. 5). Shaft 144 110 is received within bore 80 of lower portion 62 of translation member 18. The distal portion of bore 80 is split into three separate elongate members or fingers 90, 92, 94 that are coupled together at a proximal end and split apart from each other in the distal direction. The three fingers 90, 92, 94 each comprise internal ratchets (not shown) that mate with external teeth 96 on first ratchet shaft 110 (see FIG. 5) such that proximal movement of lower portion 62 of the height translation member 16 causes the internal ratchets to pass over each of the teeth 96 on ratchet shaft 110 to create discrete "steps" in the movement of the height translation member 16 relative to the endplates 12, 14. These steps correspond to height adjustments or increments of the endplates.

Figure 11:
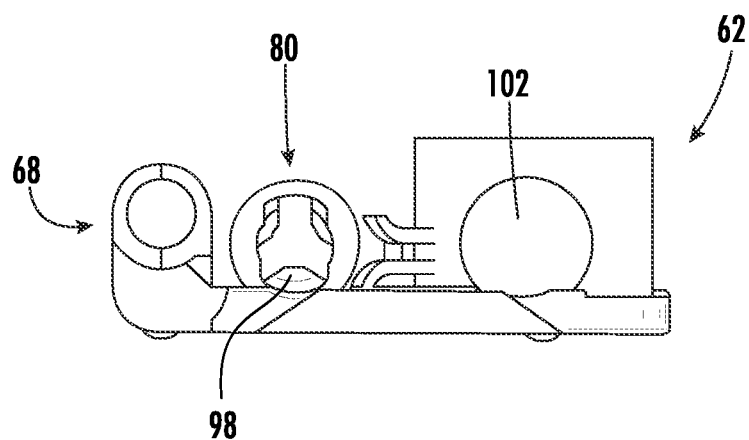
FIG. 11 is a cross-sectional view of one portion of the height translation member.
Figure 12:
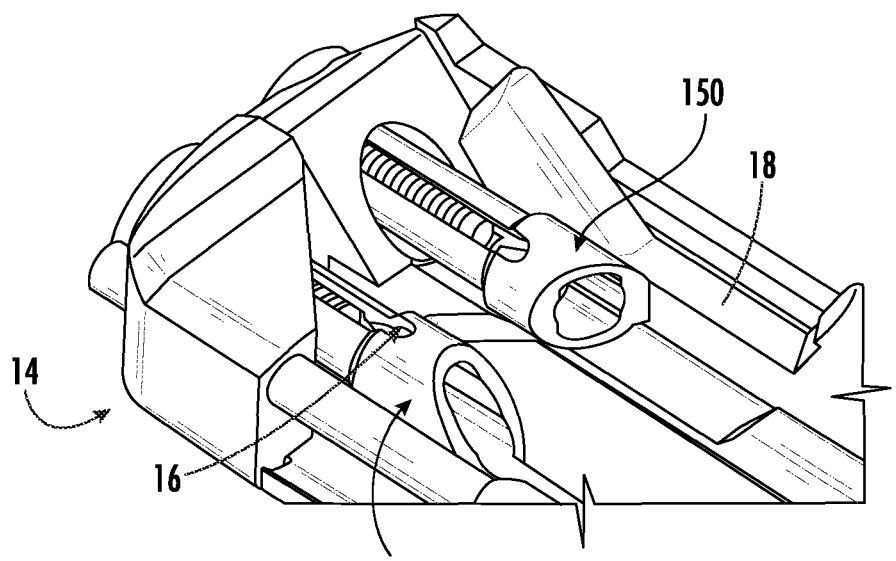
FIG. 12 is an internal view of a distal portion of the spinal device.
Figure 13:
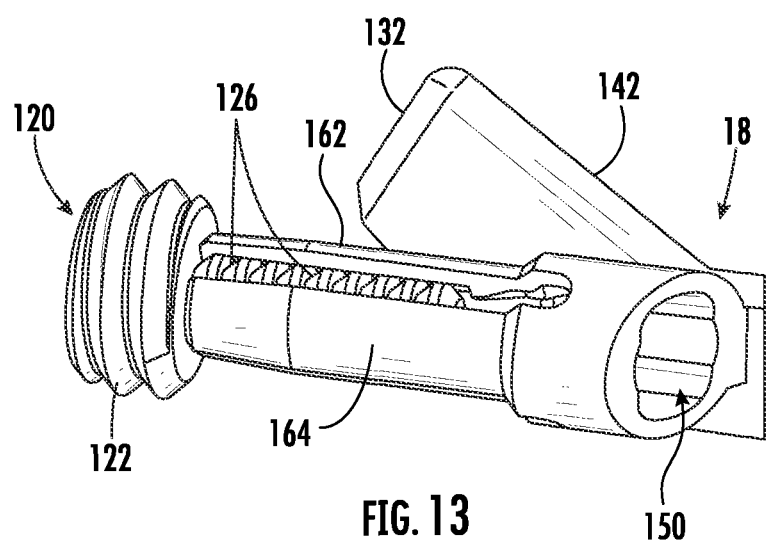
FIG. 13 illustrates a ratchet shaft and one portion of the angle translation member.

The three fingers 90, 92, 94 generally press inward against the threads or teeth 96 of ratchet shaft 110 to prevent reverse movement of height translation member 16 in the distal direction. To provide this reverse movement, each of the fingers 90, 92, 94 include internal projections 98 (see FIG. 11A) on their proximal ends designed to mate with a tapered distal end 208 of the instrument actuator shaft 202 (see FIG. 23). These internal projections 98 are designed such that distal movement of actuator shaft 202 causes tapered distal end 208 to engage projections 98 and urge the fingers laterally outward. As fingers 90, 92, 94 are urged laterally outward, the internal ratchets disengage from threads 96 of the ratchet shaft 110 such that distal movement of height translation member 16 is possible.

Referring again to FIG. 7, second lateral element 74 of lower portion 62 of the height translation member 16 has an upper surface 100 and a distal opening or bore 102 with internal threads 104. Angle translation member 18 is positioned on, or near, upper surface 100 of this lower portion 62. A second ratchet shaft 120 includes a threaded head 122 and a shaft 124 with a series of external teeth 126 extending therefrom (see FIG. 5). The threaded head 122 of the second ratchet shaft 120 is received within this bore 102.

Figure 8:
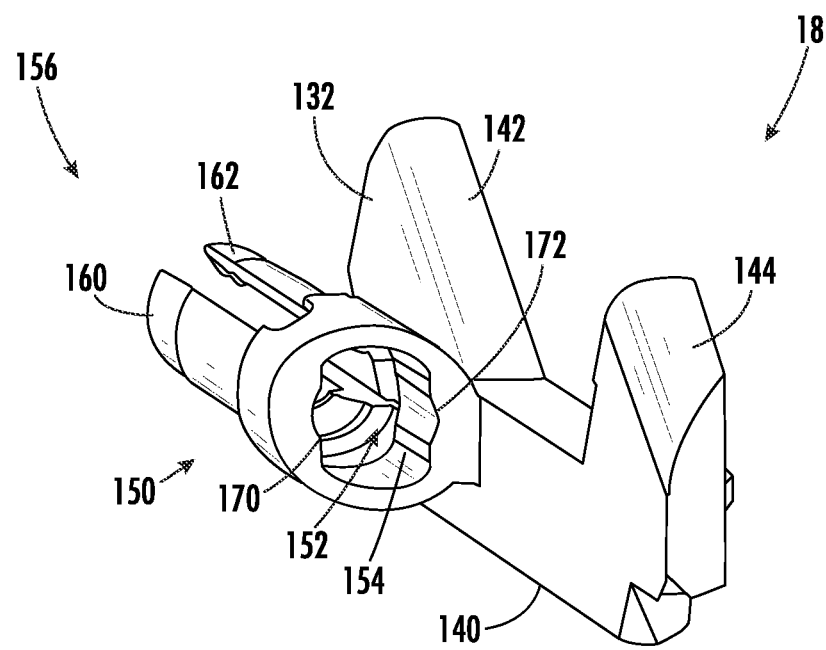
FIG. 8 is a perspective view of an angle translation member of the spinal device.

Lower portion 62 of the height translation member 16 further comprises a distal wedge surface 130 positioned to contact and engage a distal surface 132 of the angle translation member 18 (see FIG. 8). This distal wedge surface 130 contacts angle translation member 18 such that, when height translation member 16 is moved in a proximal direction, it moves angle translation member 18 therewith.

Figure 18:
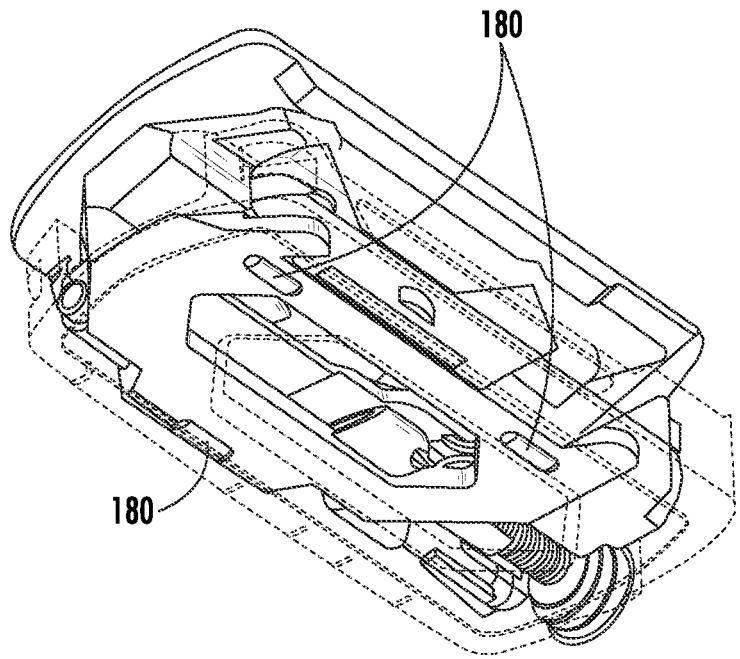
FIG. 18 is a partially transparent bottom view of the spinal device.

As shown in FIG. 18, height translation member 16 further comprises runners 180 positioned at the outer surface of height translation member adjacent to the horizontal surface of lower endplate 14 and configured to lower the friction therebetween. Alternatively, or in addition runners 180 can be provided within lower endplate 14.

Figure 17:
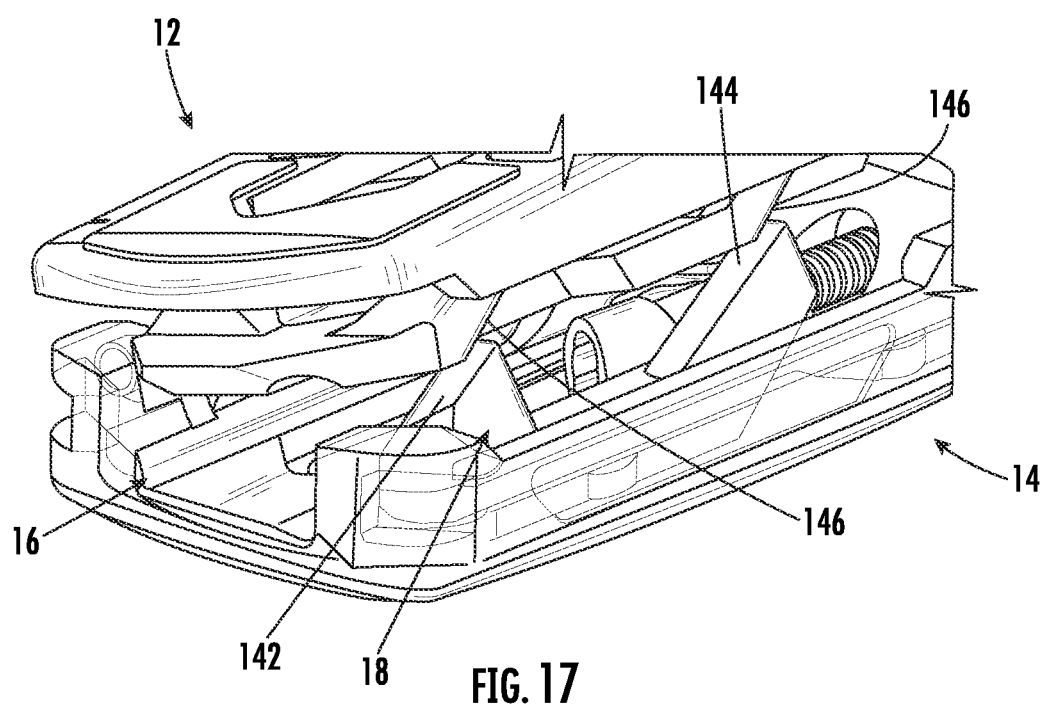
FIG. 17 illustrates the spinal device with an angle between the upper and lower endplates.

Referring now to FIG. 8, angle translation member 18 comprises an elongate body 140 extending in a longitudinal direction and positioned over the upper surface of one of lateral element 74 of lower portion 62 of height translation member 16. This elongate body 140 includes first and second wedges 142, 144 having a sloped surface that extends downwards in the proximal direction. These wedges 142, 144 are positioned to contact and engage ramps 146 on one side of upper portion 60 of height translation member 16. Ramps 146 extend downward from the lower surface of this upper portion 60 (see FIG. 17). Longitudinal movement of angle translation member 18 causes wedges 142, 144 to engage ramps 146 and move one side of height translation member 16 towards or away from lower endplate 14. Height translation member 16, in turn, causes one side of upper endplate 12 to move towards or away from lower endplate 14. Since the other side of upper endplate 12 remains fixed in place during this movement, the angle of upper endplate 12 relative to lower endplate 14 is thereby adjusted.

Angle translation member 18 further includes a cylindrical component 150 coupled to elongate body 140 and positioned closer to the longitudinal axis of implant 10. Cylindrical component 150 includes a central bore 152 with a proximal opening 154 for receiving a second shaft actuator 210 on the insertion instrument 200 and a distal opening 156 for receiving second threaded ratchet shaft 120. Bore 150 includes a mating feature, such as internal recesses 170, 172, for mating with projections 204, 206 of actuator shaft 210 (see FIG. 23) similar to the description above with respect to bore 80 of height translation member 16.

Figure 10:
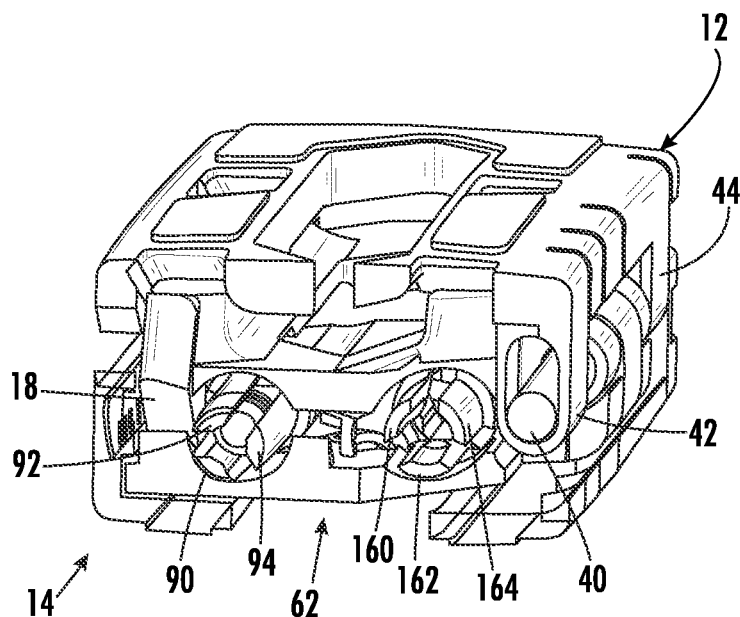
FIG. 10 is a partial cross-sectional view of the spinal device.
Figure 14:
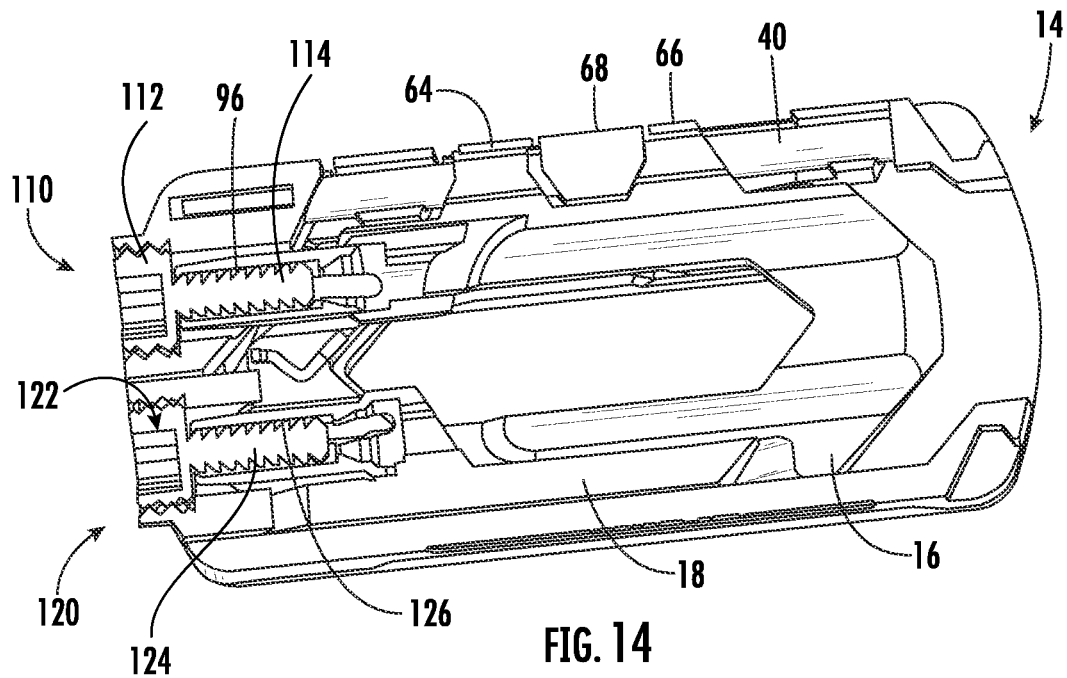
FIG. 14 is a partial cross-sectional view of the spinal device.
Figure 15:
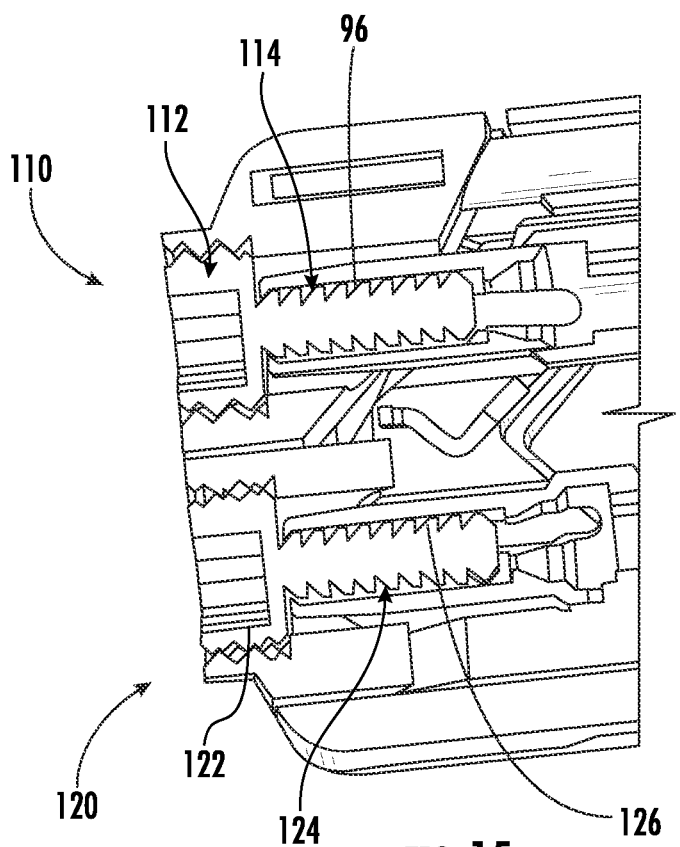
FIG. 15 illustrates internal ratchets on the height and angle translation members.

The distal portion of bore 152 may include separate and independently movable fingers or prongs. In one embodiment as shown in FIGS. 8 and 10, the bore 152 is split into three separate elongate members or fingers 160, 162, 164 that are coupled together at a proximal end and split apart from each other in the distal direction (see FIGS. 8 and 10). The three fingers 160, 162, 164 each comprise internal ratchets (not shown) that mate with second threaded ratchet shaft 120 such that proximal movement of angle translation member 18 causes the internal ratchets to pass over each of the threads 126 on ratchet shaft 120 to create discrete "steps" in the movement of the angle translation member 18 relative to the height translation member 16 and the endplates 12, 14 (see FIGS. 14 and 15). These steps correlate with angle adjustments of the endplates The three fingers 160, 162, 164 generally press inward against the second ratchet shaft 120 to prevent reverse movement of the angle translation member 18 in the distal direction. To provide this reverse movement, each of the fingers 160, 162, 164 include internal projections 168 designed to mate with a tapered distal end 216 of the second instrument actuator shaft 210. These internal projections 168 (see FIG. 11C) are designed such that distal movement of the second actuator shaft 210 causes the tapered distal end 216 to engage the projections 168 and urge the fingers 160, 162, 164 laterally outward. As the fingers are urged laterally outward, the internal ratchets 166 disengage from the teeth 126 of the ratchet shaft 120 such that distal movement of the angle translation member 18 is possible.

It is understood, of course, that the bore 152 may be divided into any number of separate and independent fingers or prongs, each of the fingers being configured as the ones shown and described above and in FIGS. 8 and 10. Accordingly, the number of fingers provided may vary without departing from their desired function. For example, in another embodiment, the bore 152 is provided with four fingers configured as two pairs of fingers on opposite sides of bore 152. In this embodiment, two of the fingers on one side of the bore are engaged by the second threaded shaft 120 while the opposite two fingers are not engaged by shaft 120. After a half-step of the ratchet shaft 120, the pair of fingers alternate such that that the opposite two fingers are engaged while the first pair of fingers are not engaged. This embodiment reduces the size or distance between each clicker step in the implant. In still other embodiments, the number of fingers may range from two to eight or more, depending on size limitations and desired travel range for the clicker step.

Figure 20:
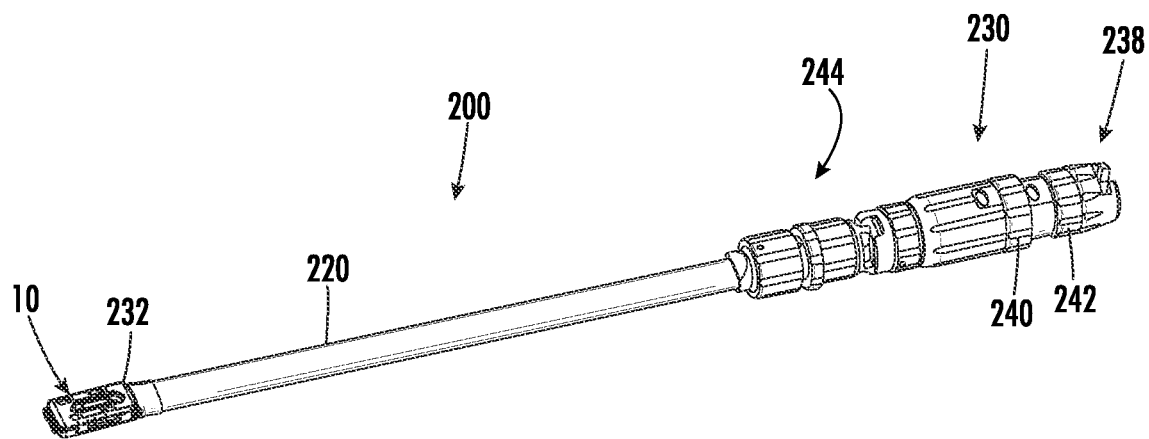
FIG. 20 is a perspective view of an instrument for inserting the spinal device between adjacent vertebral bodies.
Figure 21:
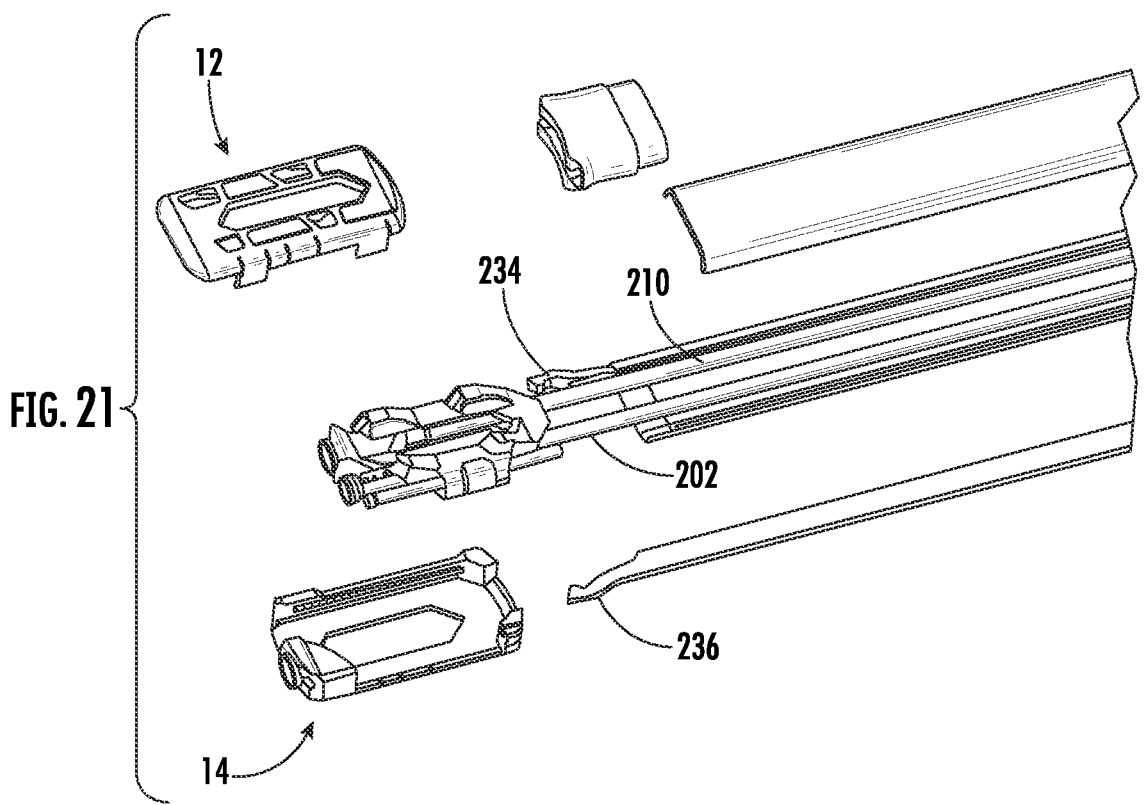
FIG. 21 is a partially exploded view of the spinal device and a distal portion of the surgical instrument.

Referring now to FIGS. 20 and 21, insertion instrument 200 comprises an elongated shaft 220 with a proximal handle 230 and a distal gripping element 232 for removable coupling to the implant. Distal gripping element 232 includes first and second gripping arms 234, 236 for coupling to lower endplate 14 of the implant (a bayonet style connection). Distal gripping arms 234, 236 are coupled to an actuator 238 on proximal handle 230 to move arms 234, 236 in a substantially lateral direction relative to the longitudinal axis of shaft 220. Arms 234, 236 can be moved together to hold lower endplate 14 and moved apart to release the endplate.

Figure 23:
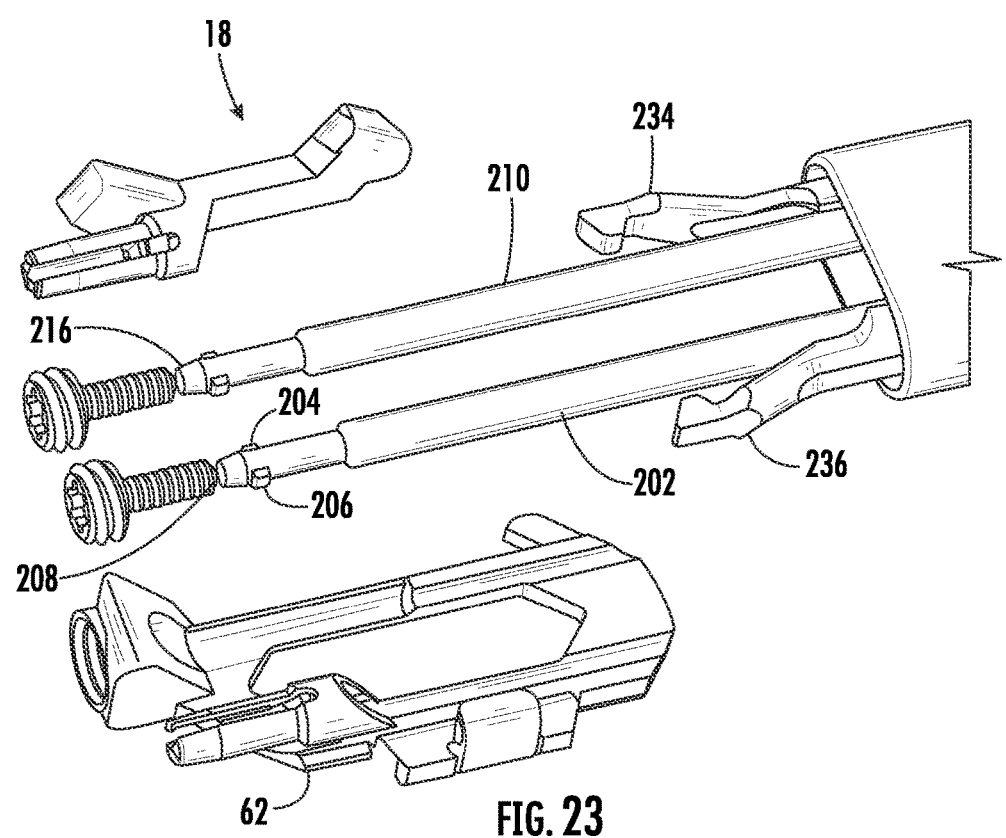
FIG. 23 is a partial exploded view illustrating components of the spinal device and the instrument.

Insertion instrument 200 further includes first and second actuator shafts 202, 210 extending from the handle 230 to the bores 80, 152 within the height and angle translation members 16, 18, respectively. First and second shafts 202, 210 are positioned on opposite lateral portions of the instrument and are both attached to rotatable knobs 240, 242 on the proximal handle for longitudinally translating the shafts. As shown in FIG. 23, each shaft 202, 210 includes a distal tapered end 208, 216 and at least two projections 204, 206 extending laterally outward from the shaft proximal of the distal tapered end. The two projections 204, 206 are designed to translate through a proximal opening of the bores 80, 152 on the height and angle translation members 16, 18. Rotation of the shafts 202, 210 causes the two projections 204, 206 to slide into the two recesses within these bores, thereby locking the shafts to the height and angle translation members. Rotation of the knobs 240, 242 on the handle then causes the shafts and the translation members to move longitudinally.

The distal tapered ends 208, 216 of the instrument shafts 202, 210 are designed to engage the three internal projections within the bores of the angle and height translation members. Proximal movement of the instrument shafts causes the distal tapered end to engage these projections and urge the three elongate distal members of the bores laterally outward to allow reverse or distal movement of the angle and translation members.

Figure 24:
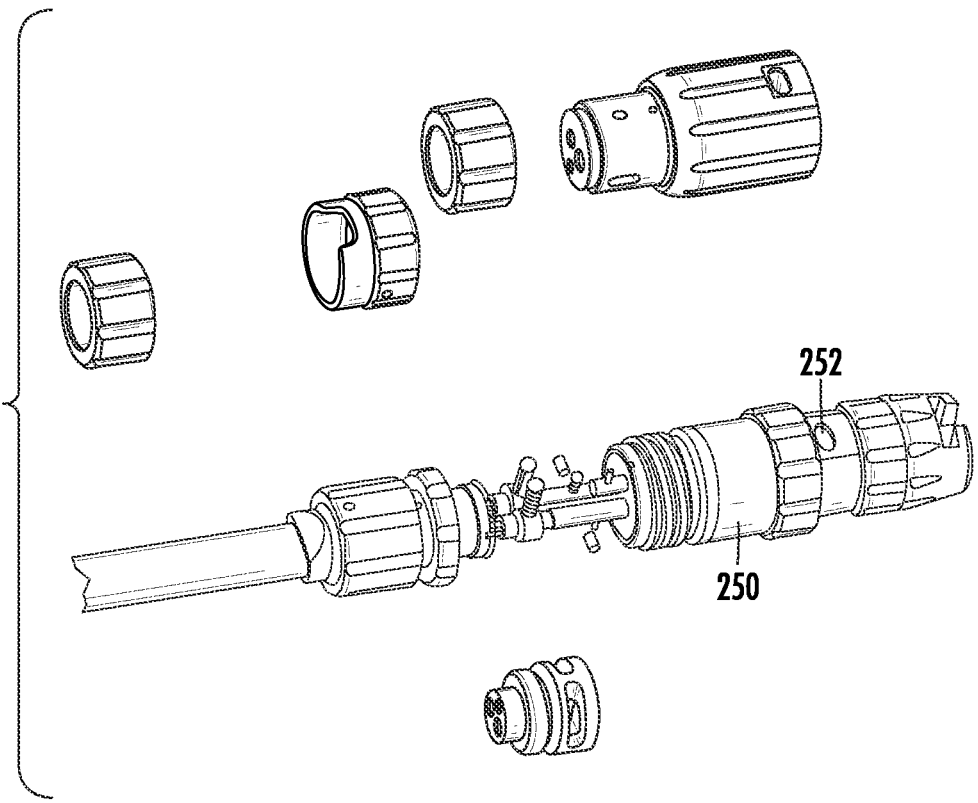
FIG. 24 is a partially exploded view of a proximal handle of the instrument.
Figure 25:
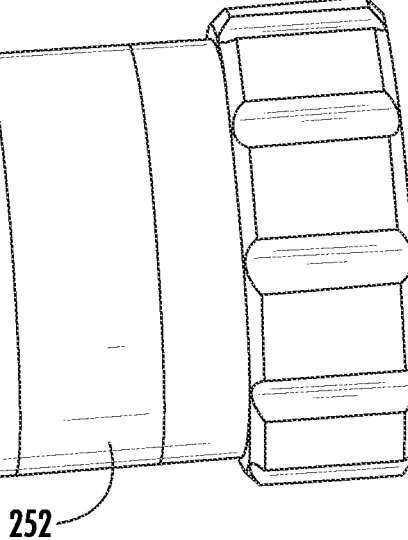
FIG. 25 illustrates a rotatable knob of the handle.
Figure 26:
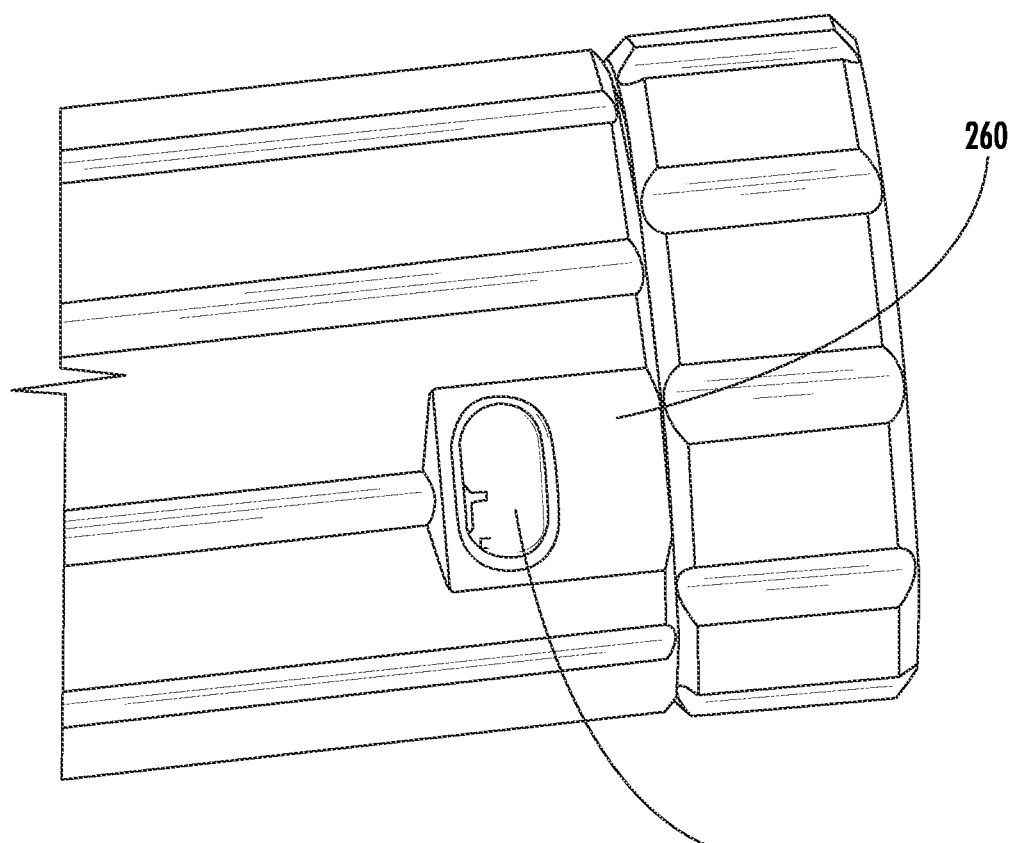
FIG. 26 illustrates an indicia of the rotatable knob.

As shown in FIGS. 24-26, the proximal handle 230 comprises position indicators 250, 252 configured to indicate the position of each actuator shaft 202, 210, respectively. The position indicators 250, 252 may be formed in a recess 260 of handle 230.

The handle further includes a third rotatable knob 244 coupled to the shaft for rotating the shaft and the endplate therewith relative to the handle. This allows for rotation of the endplate without rotating the handle to facilitate ease of use during implantation.

Figure 19A:
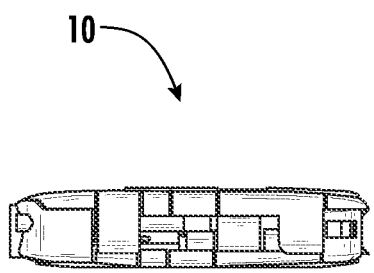
FIG. 19A is a side view of the spinal device in a configuration for insertion between adjacent vertebral bodies.
Figure 19B:
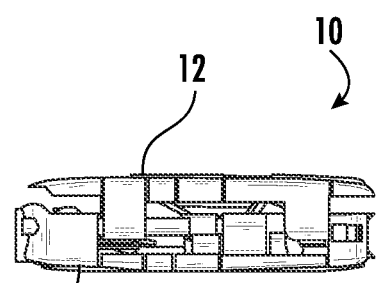
FIG. 19B is a side view of the spinal device with an adjustment in height.

In use, the implant may be advanced into an intervertebral space in a collapsed configuration (see the resting state shown in FIG. 19A). To increase the height of the implant, the endplates are moved away from each other in a substantially parallel direction. To that end, the first and second instrument shafts are advanced distally through the bores of the angle and height translation members and rotated 90 degrees to lock the shafts to the translation members. The rotatable knob (green) on the handle is rotated to thereby withdraw its associated shaft proximally. This translates both the height and angle translation members in the proximal direction. As the height translation member moves in the proximal direction, its four upper wedges engage with the upper endplate ramps such that the endplates move apart from each other in a substantially parallel direction (see expanded state shown in FIG. 19B).

Figure 19C:
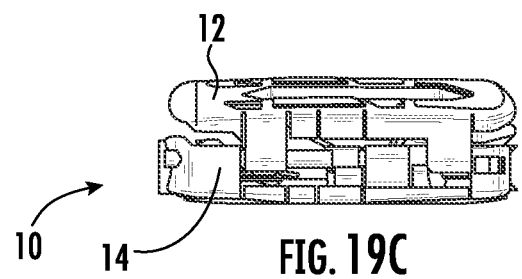
FIG. 19C is a side view of the spinal device with an adjustment in height and angle.

To adjust the angle of the endplates, the rotatable knob (red) on the handle is rotated, thereby withdrawing its associated shaft proximally. The angle translation member is translated in a proximal direction relative to both the endplates and the height translation member. The wedges on the angle translation member engage the ramps on the one side of the height translation member to move this side upwards away from the lower endplate, thereby adjusting the angle of the upper endplate relative to the lower endplate (see angularly adjusted state shown in FIG. 19C).

The process of height and angle adjustment is reversible. The height and angle may be adjusted independently of each other. For example, the above process can be reversed such that the shaft of the angle translation member is first rotated to adjust angle, and then the shaft of the height translation member is rotated to adjust height.

Referring now to FIGS. 27-32, plate 302 is coupled to, or formed integrally with, the proximal end of device 10 and includes through-holes 304, 306 for receiving fasteners 308, 310. Fasteners 308, 310 may comprise any suitable fastening device, such as cannulated or uncannulated screws, bolts, nails or the like. In one embodiment, fasteners 308, 310 comprise screws having a head, a threaded shaft and a distal tip for advancing the screws into adjacent vertebral bodies to secure device 10 between the vertebral bodies. Through-holes 304, 306 may be oriented such that fasteners 308, 310 extend substantially parallel to the outer surfaces of endplates 12, 14, or they may be oriented such that fasteners 308, 310 extend at an acute angle to endplates 12, 14 (as shown in FIG. 1).

Figure 27:
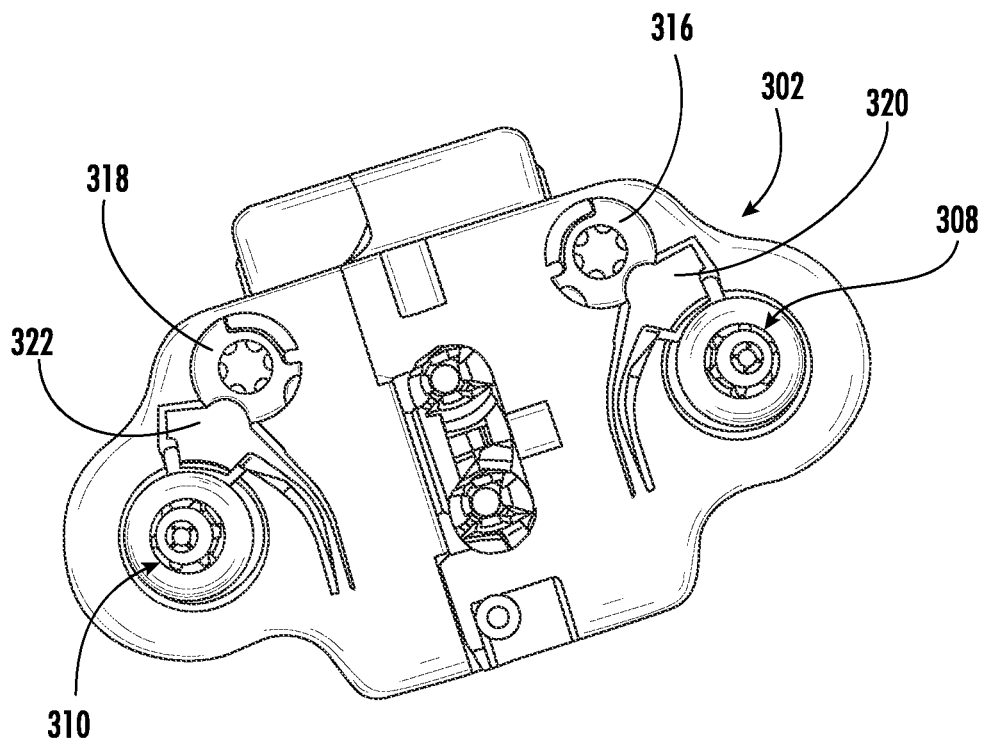
FIG. 27 illustrates a proximal side of the spinal system of FIG. 1.
Figure 28:
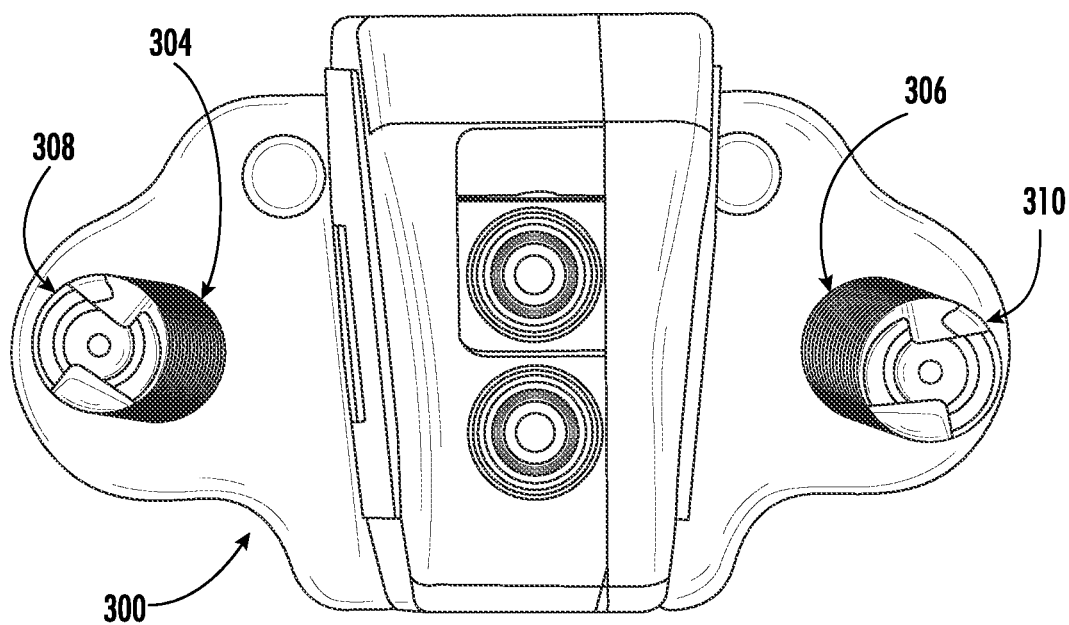
FIG. 28 illustrates a distal side of the spinal system.
Figure 29A:
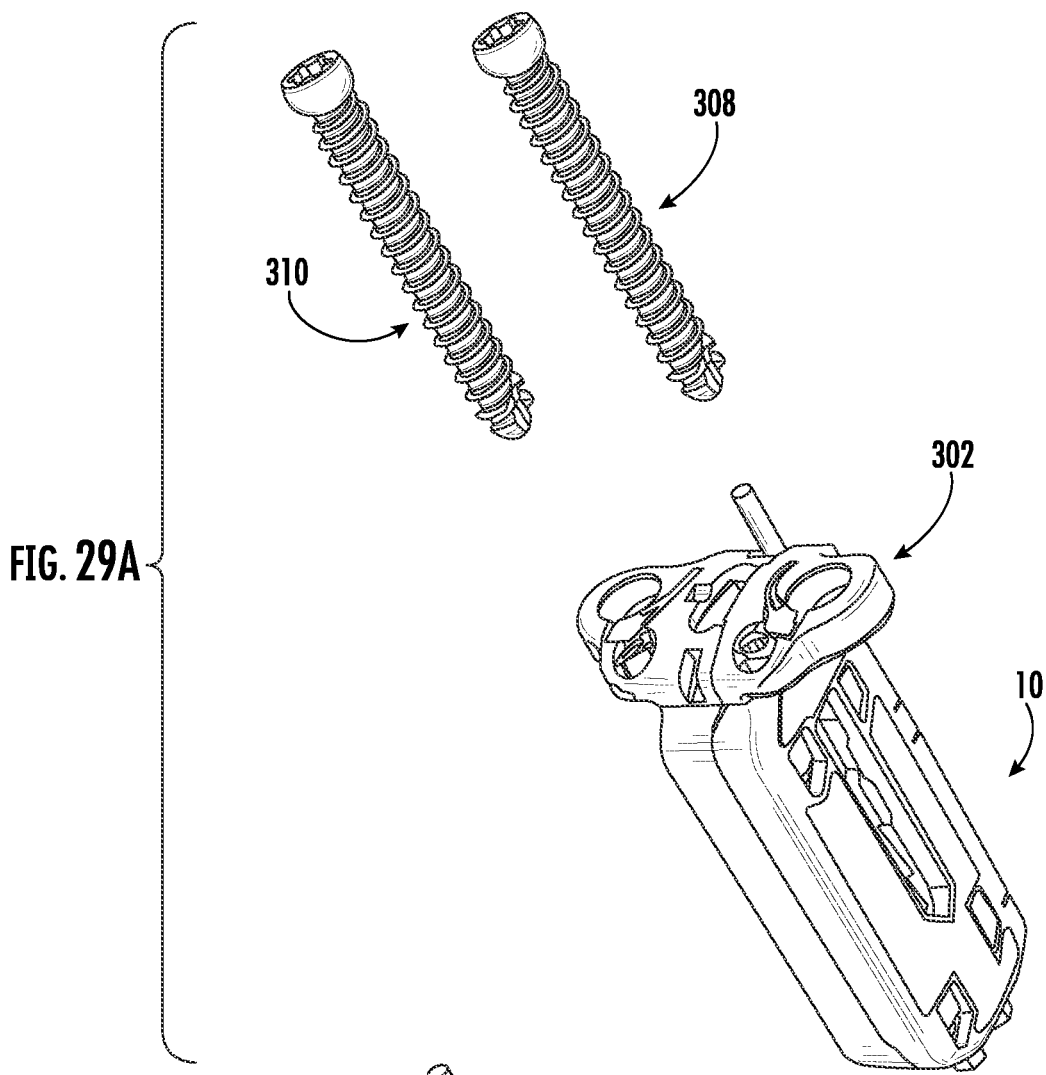
FIG. 29A illustrates first and second fasteners prior to insertion into through-holes in a proximal plate of the spinal system.
Figure 29B:
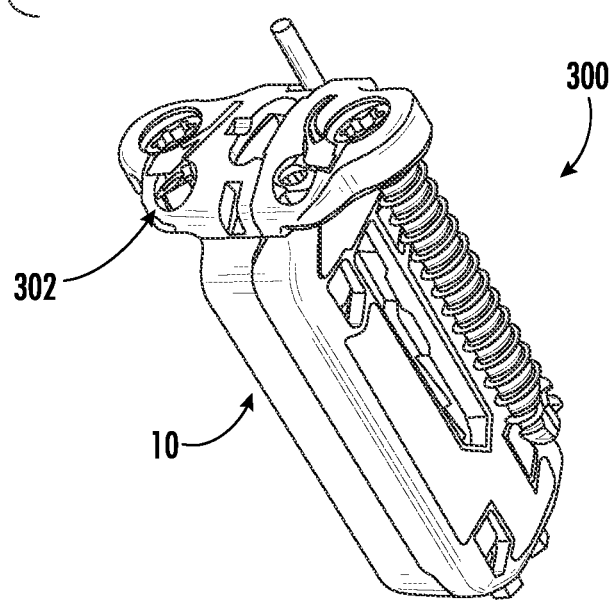
FIG. 29B illustrates the fasteners inserted into the through-holes in the proximal plate of the system.
Figure 30:
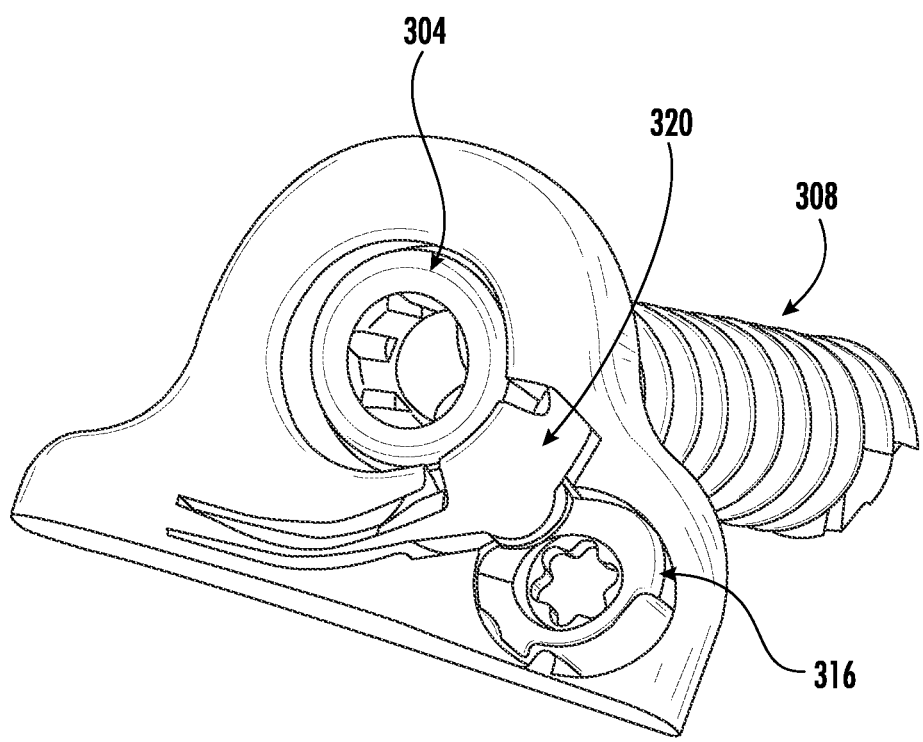
FIG. 30 is a close up view of one fastener and its through-hole.
Figure 31:
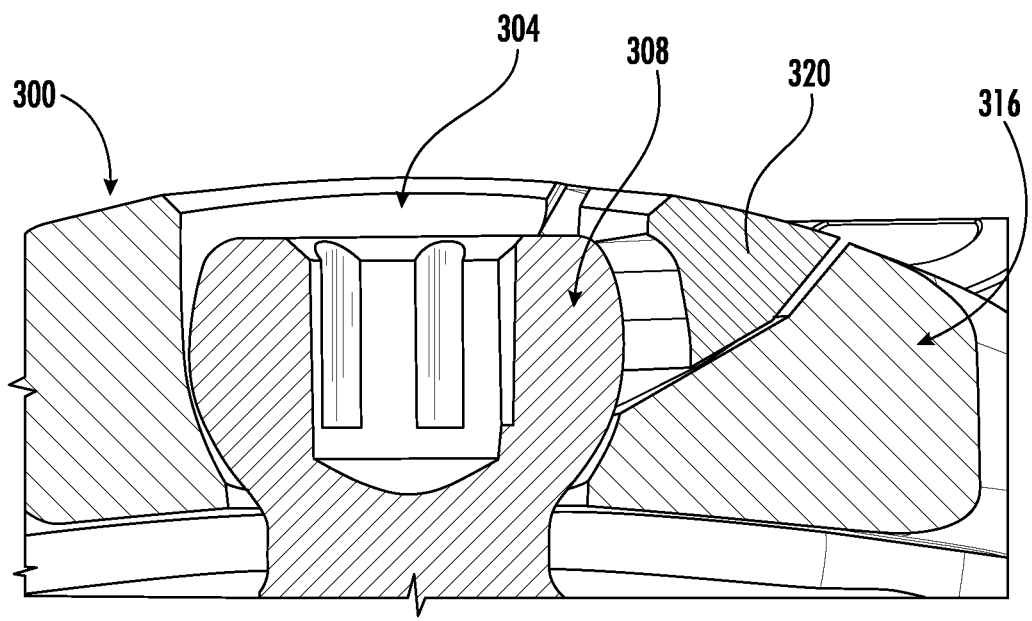
FIG. 31 illustrates a locking element for the fastener in an unlocked position.
Figure 32:
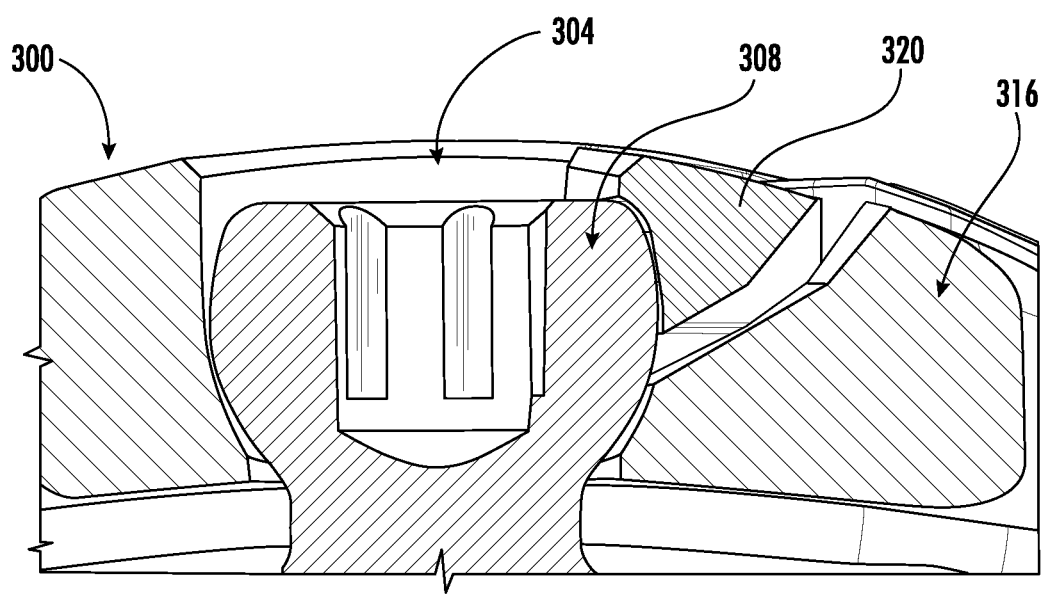
FIG. 32 illustrates the locking element in the locked position.
Figure 33:
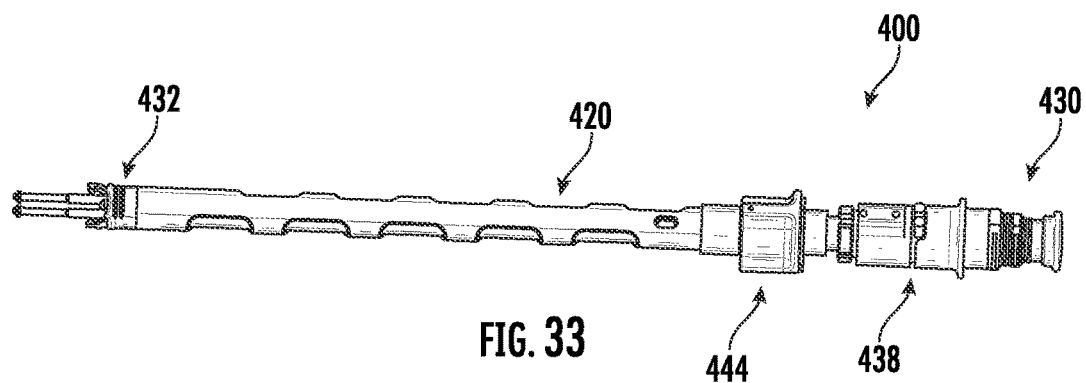
FIG. 33 illustrates another embodiment of an instrument for inserting the spinal device between adjacent vertebral bodies.
Figure 34:
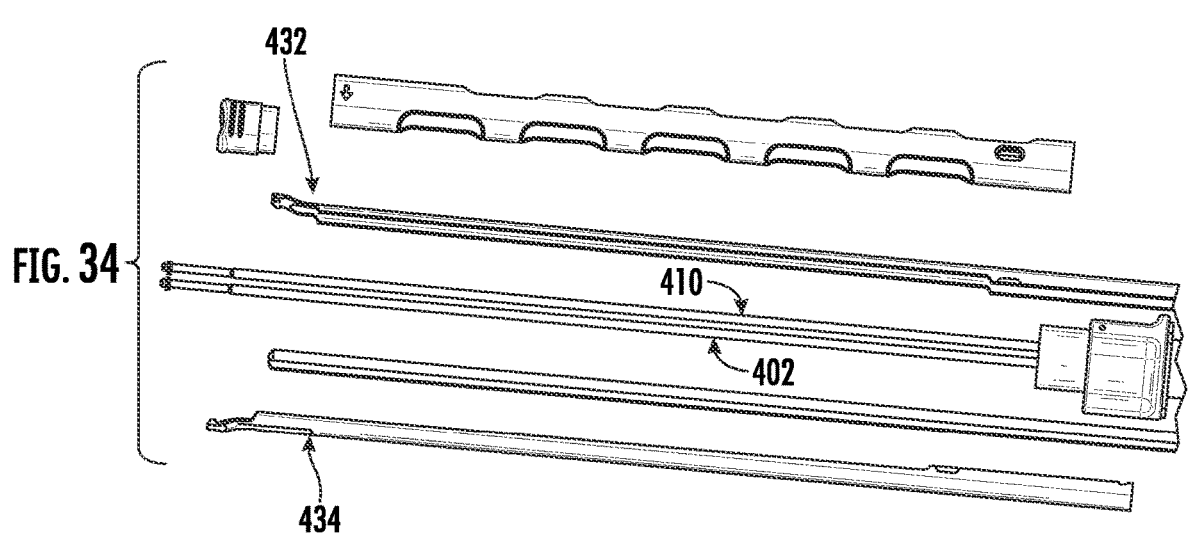
FIG. 34 is a partially exploded view of a distal end of the instrument of FIG. 33.

As shown in FIG. 27, fixation plate 302 including a locking or anti-backout mechanism for securing fasteners 308, 310 to through-holes 304, 306. The locking mechanism includes locking screws 316, 318 and leaf springs 320, 322 positioned on a proximal surface of plate 302. Locking screws 316, 318 each include a mating feature for cooperating with an external instrument (not shown) to rotate screws 316, 318. Locking screws 316, 318 are coupled to leaf springs 320, 322 such that rotation of screws 316, 318 moves leaf springs 320, 322 towards through-holes 304, 306. Leaf springs 320, 322 are naturally biased away from through-holes 304, 306.

In use, locking screws 316, 318 start in the unlocked position (FIG. 31) such that leaf springs 320, 322 are spaced from through-holes 304, 306. Fasteners 318, 310 are advanced into the vertebral bodies to secure system in place (see FIGS. 29A and 29B). Once the fasteners have been fully advanced into the through-holes such that the heads of the fasteners rest within the proximal recesses 330 of plate 302, an instrument is used to rotate locking screws 316, 318 such that leaf springs 320, 322 move over the heads of the fasteners into the locked position (See FIG. 32). This prevents the fasteners from backing out or otherwise loosening from through-holes 304, 306.

Referring now to FIGS. 33-36, another embodiment of an instrument 400 for inserting any of the implantable spinal devices described above between adjacent vertebral bodies will now be described. Similar to the previous embodiment, instrument 400 comprises an elongated shaft 420 with a proximal handle 430 and a distal gripping element 432 for removable coupling to the implant. Distal gripping element 432 includes first and second gripping arms 434, 436 for coupling to the lower and/or upper endplates of the implant (a bayonet style connection). Distal gripping arms 434, 436 are coupled to an actuator 438 on proximal handle 430 to move arms 434, 236 in a substantially lateral direction relative to the longitudinal axis of shaft 420. Arms 434, 436 can be moved together to hold the endplates and moved apart to release the endplates.

Figure 35:
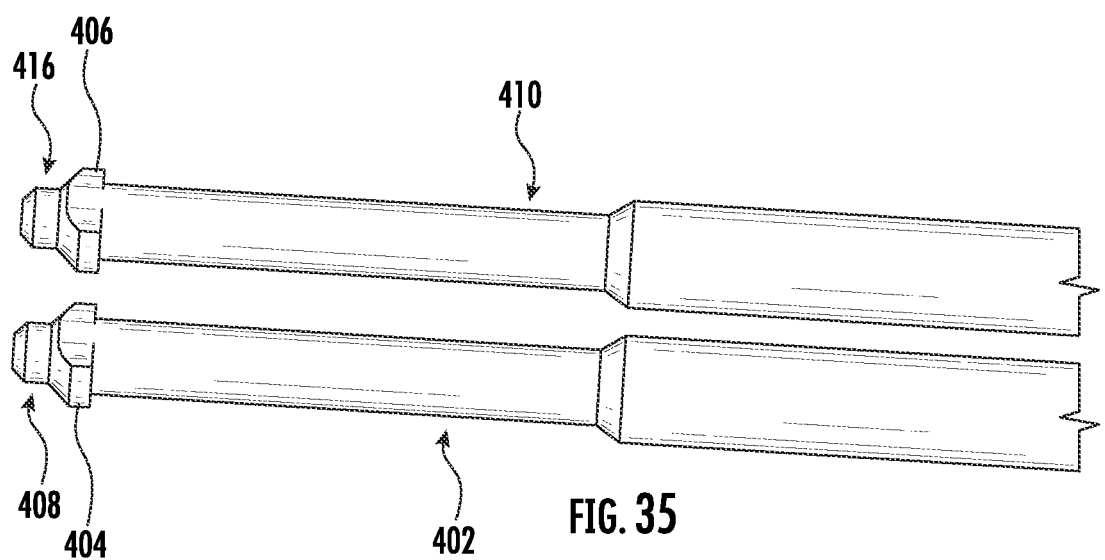
FIG. 35 is an enlarged view of a distal end of two actuator shafts of the instrument of FIG. 33.
Figure 36:
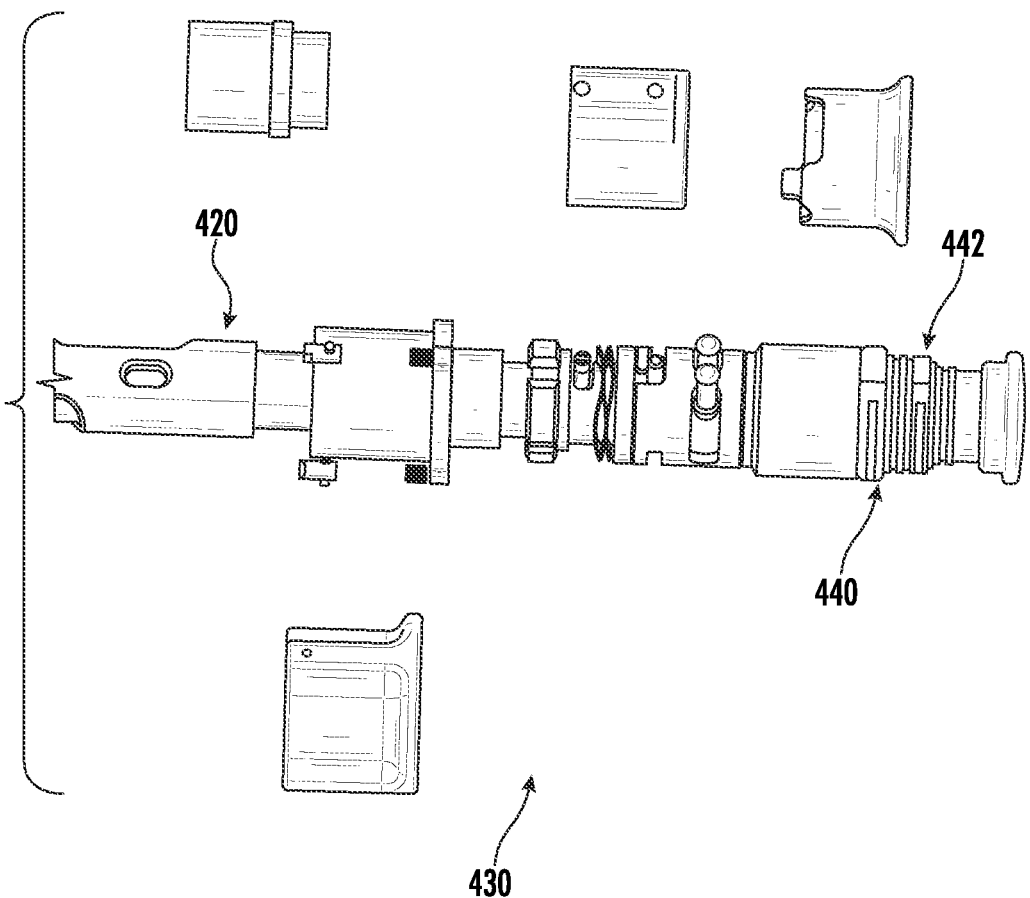
FIG. 36 is an exploded view of a proximal end of the instrument of FIG. 33.

Insertion instrument 400 further includes first and second actuator shafts 402, 410 extending from the handle 430 to the bores 80, 152 within the height and angle translation members 16, 18, respectively. First and second shafts 402, 410 are positioned on opposite lateral portions of the instrument and are both attached to rotatable knobs 440, 442 on the proximal handle for longitudinally translating the shafts. As shown in FIG. 35, each shaft 402, 410 includes a distal tapered end 408, 416 and at least two projections 404, 406 extending laterally outward from the shaft proximal of the distal tapered end. The two projections 404, 406 are designed to translate through a proximal opening of the bores 80, 152 on the height and angle translation members 16, 18. Rotation of the shafts 402, 410 causes the two projections 404, 406 to slide into the two recesses within these bores, thereby locking the shafts to the height and angle translation members. Rotation of the knobs 440, 442 on the handle then causes the shafts and the translation members to move longitudinally.

The distal tapered ends 408, 416 of the instrument shafts 402, 410 are designed to engage the internal projections within the bores of the angle and height translation members. Proximal movement of the instrument shafts causes the distal tapered end to engage these projections and urge the elongate distal members of the bores laterally outward to allow reverse or distal movement of the angle and translation members.

The proximal handle 430 may also comprise position indicators (not shown) configured to indicate the position of each actuator shaft 402, 410, respectively. The position indicators may comprise visual markings or the like.

The handle further includes a third rotatable knob 444 coupled to the shaft for rotating the shaft and the endplate therewith relative to the handle. This allows for rotation of the endplate without rotating the handle to facilitate ease of use during implantation.

Figure 37:
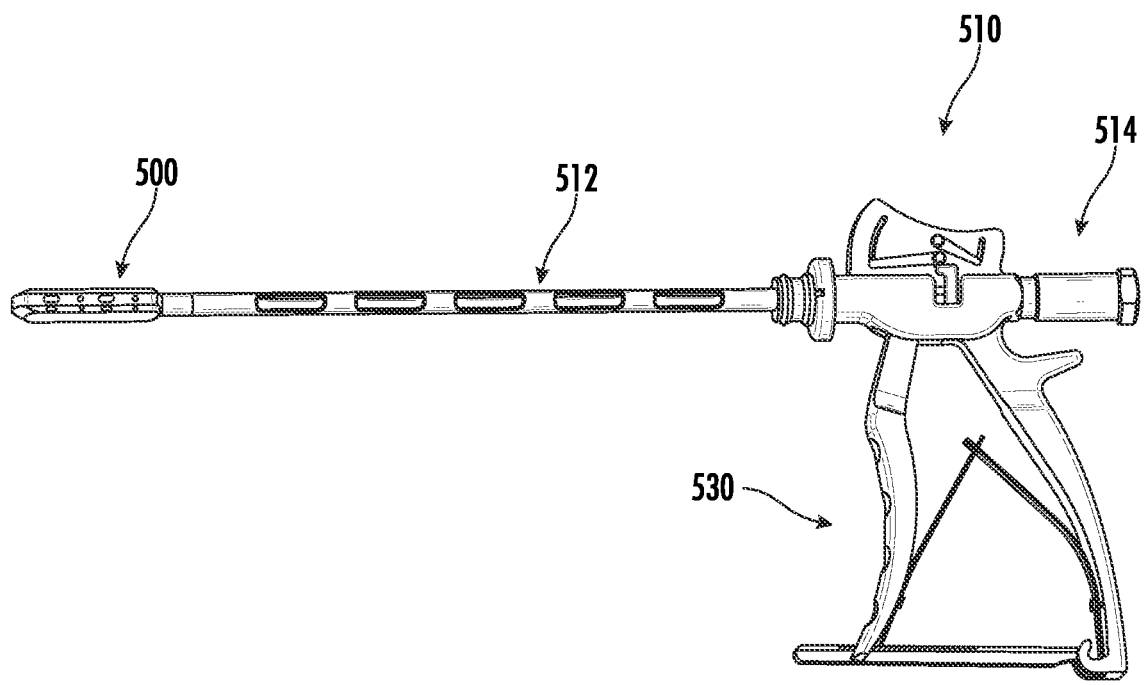
FIG. 37 illustrates a trial implant and an instrument for inserting the trial implant between adjacent vertebral bodies.
Figure 38:
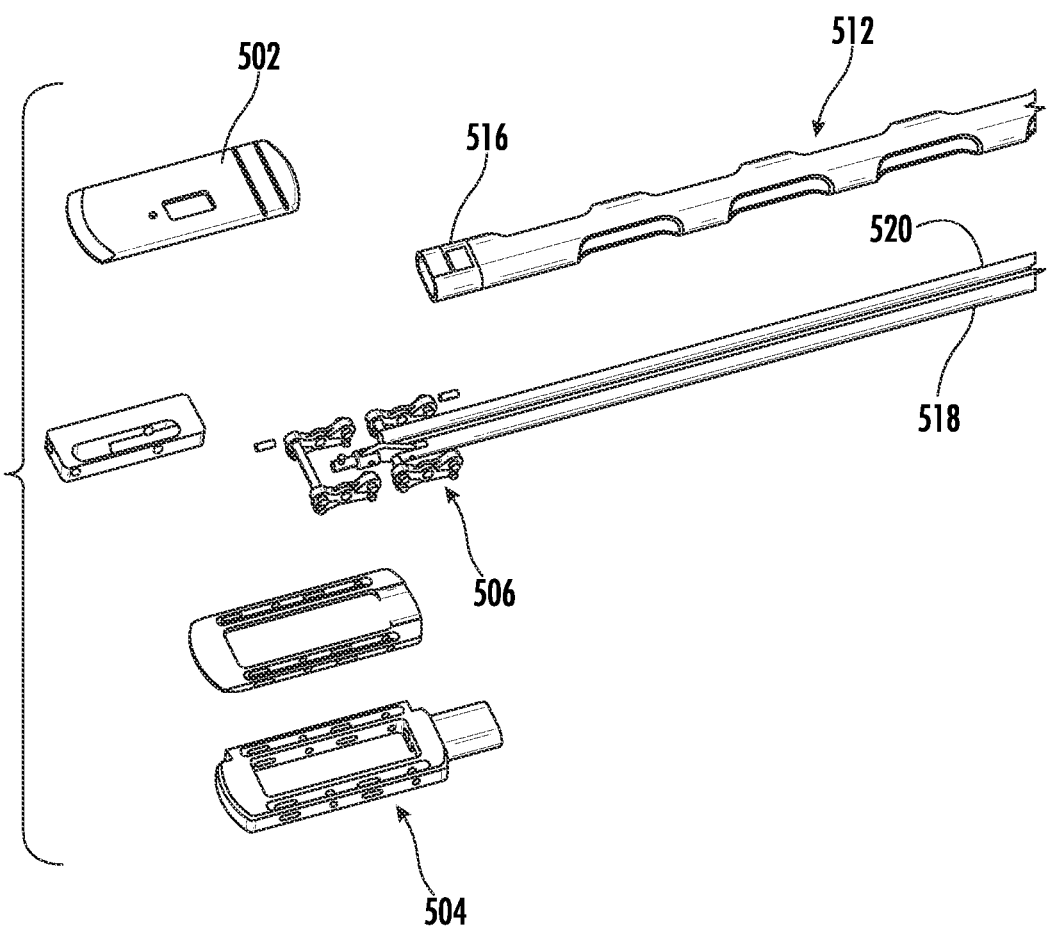
FIG. 38 is an exploded view of a distal portion of the trial implant and instrument of FIG. 37.

Referring now to FIGS. 37-39, a trial implant 500 and an instrument 510 for inserting implant 500 between two adjacent vertebral bodies will now be described. Trial implant 500 may be useful for determining an optimal size and shape that corresponds with the size and shape of the space between adjacent vertebral bodies of a particular patient. Trial implant 500 will typically be inserted between the vertebral bodies and adjusted in height and angle until the physician determines the optimal desired size of the spinal implant. Trial implant 500 will then be removed so that the physician can select the proper spinal implant for the procedure.

As shown, trial implant 500 generally comprises first and second endplates 502, 504 and an articulation assembly 506 for adjusting the height and angle of implant 500. Instrument 510 generally includes an elongate shaft 512, a proximal handle 514 and a distal end 516 coupled to lower endplate 504. Instrument 510 further comprises first and second actuator shafts 518, 520 extending through shaft 512. Articulation assembly 506 of trial implant 500 is coupled to first and second actuator shafts 518, 520 for adjusting the height and angle of implant 500.

As shown in FIGS. 37 and 39, proximal handle 514 comprises a grip 530 that includes proximal and distal arms 532, 534. Proximal arm 532 is coupled to first actuator shaft 518 and distal arm 534 is coupled to second actuator shaft 520 to move these shafts longitudinally to adjust the height and angle, respectively, of trial implant 500. Proximal handle 514 further includes visual indicators 536, 538 that provide markings to illustrate the height and angle adjustments. Proximal and distal arms 532, 534 are each coupled to linkages 542, 544 that rotate relative to visual indicators 536, 538 to provide specific height (i.e., distance between the endplates) and lordosis angle (i.e., degrees of angle between endplates) indications to the user. Proximal handle 514 may also include a rotatable knob 540 for rotating the shaft and the endplate therewith relative to the handle.

The entire implant is fabricated through additive manufacturing techniques, such as 3D printing. The implant is formed layer by layer in the longitudinal direction from the proximal end to the distal end. Upon completion of manufacturing, the upper and lower endplates are coupled to each other at certain locations and then separated by a wire EDM process that creates linear cuts to separate the endplates. The hinge rod is machined separately and then inserted through openings in the proximal and distal ends of the lower endplate and through the cylinders in the upper and lower portions of the height translation member.

In an exemplary embodiment, the implants are produced by Selective Laser Melting (SLM). For example, a substrate plate is fastened to an indexing table inside a chamber with a controlled atmosphere of inert gas (e.g., argon or nitrogen). Metal powder is applied flat to the substrate plate as a layer. The metal powder is preferably a titanium alloy, e.g. Ti-6Al-4V to enable biocompatibility. Each 2D slice of the cage is fused by selectively melting the metal powder via a laser. The laser has enough energy to fully melt or rather weld the metal particles to form solid metal. The substrate plate is lowered by the layer thickness (z-direction). New metal powder is applied and the process is repeated layer by layer until the part is complete. The completed part is removed from the substrate plate by cutting or breaking off.

Preferably, all components of the cage are printed nested within each other. Compared to separately 3D printing all components next to each other, a higher utilization rate can be achieved. This means that during 3D printing, a higher proportion which is melted and a lower proportion which stays as metal powder can be achieved. Thus, production time and costs can be reduced significantly.

After 3D printing, areas connecting single components of the cage are cut by electrical discharge machining (EDM) to enable their separate movement. Further, EDM can be used to realize smooth surfaces, e.g., to enable low-friction sliding of two components against each other. With EDM, the cage can also be removed from the substrate plate.

To lower production costs, several cages can be printed onto one substrate plate. In this case, before removing the cages, EDM can be used to simultaneously cut all cages placed on the substrate plate.

The implant may comprise one or more exhaust openings in the upper and lower endplates to allow for extraction of the metal powder remaining in the cage after 3D printing. Preferably, the exhaust opening is positioned on a lateral surface of the moving plate. It is also possible to position the exhaust opening on a horizontal surface of the cage, preferably on the base plate or on the moving plate. Preferably, the cage comprises multiple exhaust openings. Thus, more areas inside the cage are reachable and the metal powder can be extracted more efficiently. It is also possible to configure an external sliding means, preferably a conical groove, in such a way that it can be additionally used as an exhaust opening. Therefore, the conical groove is deepened until a passage to the outside has been made.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

What is claimed is:
1. An adjustable spinal fusion device, comprising:
    an upper plate having an outer surface for placement against a first vertebral body, proximal and distal ends, and first and second sides extending from the proximal end to the distal end;
    a lower plate having an outer surface for placement against a second vertebral body, proximal and distal ends, and first and second sides extending from the proximal end to the distal end;

a first translation member configured to move longitudinally relative to the upper and lower plates to adjust a distance between the upper and lower plates; and
a second translation member configured to move longitudinally relative to the upper and lower plates to adjust an angle between the upper and lower plates;
wherein the second translation member includes a movable wedge with at least one angled surface, and the first translation member includes at least one angle surface positioned to cooperate with the movable wedge of the second translation member, and
wherein the movable wedge and the at least one angled surface are positioned on the first side of the upper and lower plates such that longitudinal movement of the second translation member causes the first side of the upper plate to move towards and away from the first side of the lower plate.

2. The adjustable spinal fusion device of claim 1, wherein the second translation member is configured to adjust the angle between the first and second sides.

3. The adjustable spinal fusion device of claim 2, further comprising a hinge on one of the first and second sides for rotatably coupling the upper plate to the lower plate.

4. The adjustable spinal fusion device of claim 3, wherein the upper plate comprises one or more knuckles and further comprising a rod coupled to the lower plate and extending through the one or more knuckles.

5. The adjustable spinal fusion device of claim 1, wherein longitudinal movement of the first translation member causes longitudinal movement of the second translation member to adjust the distance between the upper and lower plates and longitudinal movement of the second translation member relative to the first translation member adjusts the angle between the upper and lower plates.

6. The adjustable spinal fusion device of claim 1, wherein the first translation member comprises a first bore with a mating feature for cooperating with a first actuator shaft of a surgical instrument to move the first translation member in the longitudinal direction.

7. The adjustable spinal fusion device of claim 6, wherein the second translation member comprises a second bore with a mating feature for cooperating with a second actuator shaft of a surgical instrument to move the second translation member in the longitudinal direction.

8. The adjustable spinal fusion device of claim 1, wherein the first translation member includes a movable wedge having at least one angled surface and wherein the upper plate comprises first and second proximal ramps and first and second distal ramps extending towards the lower plate each in the proximal direction, wherein the first translation member comprises first and second upper proximal angled surfaces for cooperating with the first and second proximal ramps of the upper plate and first and second distal angled surfaces for cooperating with the first and second distal ramps of the upper plate.

9. The adjustable spinal fusion device of claim 1, further comprising an endplate coupled to a proximal surface of at least one of the upper and lower plates, and a fastener extending through a through-hole of the endplate such that the fastener extends along the outer surface of one of the upper and lower plates, wherein the fastener is configured for advancement into one of the first and second vertebral bodies.

10. The adjustable spinal fusion device of claim 9, further comprising a locking element coupled to the through-hole of the endplate, wherein the locking element is movable from an unlocked position, wherein the fastener may be passed through the through-hole, and a locked position, wherein the fastener is secured within the through-hole.

11. The adjustable spinal fusion device of claim 10, wherein the locking element comprises a rotatable element and a spring, wherein rotation of the rotatable element moves the spring into engagement with the through-hole into the locking position.

12. A spinal fusion system, comprising:
an adjustable spinal fusion device comprising:
an upper plate having an outer surface for placement against a first vertebral body;
a lower plate having an outer surface for placement against a second vertebral body; and
a first movable wedge configured to move longitudinally relative to the upper and lower plates to adjust a distance and an angle between the upper and lower plates;
a second movable wedge, wherein longitudinal movement of the first movable wedge causes longitudinal movement of the second movable wedge to adjust the distance between the upper and lower plates, and wherein longitudinal movement of the second movable wedge relative to the first movable wedge adjusts the angle between the upper and lower plates; and
an instrument having a proximal handle, an elongate shaft and an actuator within the elongate shaft coupled to the proximal handle and the first movable wedge for translating the movable wedge longitudinally relative to the upper and lower plates, wherein the actuator comprises a first rotatable shaft coupled to the first movable wedge and a second rotatable shaft coupled to the second movable wedge.

13. The system of claim 12, further comprising a hinge on one of first and second sides of the upper and lower plates for rotatably coupling the upper plate to the lower plate, wherein the upper plate comprises one or more knuckles and further comprising a rod coupled to the lower plate and extending through the one or more knuckles.

14. An adjustable spinal fusion device, comprising:
an upper plate having an outer surface for placement against a first vertebral body, proximal and distal ends and first and second sides extending from the proximal end to the distal end;
a lower plate having an outer surface for placement against a second vertebral body, proximal and distal ends and first and second sides extending from the proximal end to the distal end;
a hinge on the second sides of the upper and lower plates for rotatably coupling the upper plate to the lower plate, the hinge comprising a rod extending in a longitudinal direction along the second sides of the upper and lower plates;
a first translation member configured to move longitudinally relative to the upper and lower plates to rotate the upper plate relative to the lower plate and adjust a distance between the first side of the upper plate and the first side of the lower plate; and
a second translation member configured to move longitudinally relative to the upper and lower plates to adjust a height between the upper and lower plates, wherein the second translation member comprises a knuckle for receiving the rod and at least one angled surface positioned to cooperate with a ramp of the first translation member, wherein the ramp and the at least one angled surface are positioned on the first side of the plates such that longitudinal movement of the first translation member causes the first side of the upper plate to move towards and away from the first side of the lower plate.

15. The spinal fusion device of claim 14, wherein the upper plate comprises one or more knuckles rotatably coupled to the rod.

16. The spinal fusion device of claim 15, wherein the one or more knuckles have a hollow interior with a height larger than an outer diameter of the rod to allow the second side of the upper plate to move relative to the second side of the lower plate.

17. An adjustable spinal fusion device, comprising:
an upper plate having an outer surface for placement against a first vertebral body;
a lower plate having an outer surface for placement against a second vertebral body;
a first translation member configured to move longitudinally relative to the upper and lower plates to adjust a distance between the upper and lower plates; and
a second translation member configured to move longitudinally relative to the upper and lower plates to adjust an angle between the upper and lower plates;
wherein longitudinal movement of the first translation member causes longitudinal movement of the second translation member to adjust the distance between the upper and lower plates, and longitudinal movement of the second translation member relative to the first translation member adjusts the angle between the upper and lower plates.

18. The adjustable spinal fusion device of claim 17, wherein the upper and lower plates each have proximal and distal ends and first and second sides extending from the proximal end to the distal end, and wherein the second translation member is configured to adjust the angle between the first and second sides.

19. The adjustable spinal fusion device of claim 18, further comprising a hinge on one of the first and second sides for rotatably coupling the upper plate to the lower plate.

20. The adjustable spinal fusion device of claim 18, wherein the upper plate comprises one or more knuckles, and further comprising a rod coupled to the lower plate and extending through the one or more knuckles.

21. The adjustable spinal fusion device of claim 17, wherein the first translation member comprises a first bore with a mating feature for cooperating with a first actuator shaft of a surgical instrument to move the first translation member in the longitudinal direction.

22. The adjustable spinal fusion device of claim 21, wherein the second translation member comprises a second bore with a mating feature for cooperating with a second actuator shaft of a surgical instrument to move the second translation member in the longitudinal direction.

23. The adjustable spinal fusion device of claim 22, wherein the first translation member includes a movable wedge having at least one angled surface and wherein the upper plate comprises first and second proximal ramps and first and second distal ramps extending towards the lower plate each in the proximal direction, and
wherein the first translation member comprises first and second upper proximal angled surfaces for cooperating with the first and second proximal ramps of the upper plate and first and second distal angled surfaces for cooperating with the first and second distal ramps of the upper plate.

24. The adjustable spinal fusion device of claim 23, wherein the second translation member includes a second movable wedge with at least one angled surface and the first translation member includes at least one angle surface positioned to cooperate with the second movable wedge of the second translation member, and
wherein the second movable wedge and the at least one angled surface are positioned on a first side of the upper plate such that longitudinal movement of the second translation member causes the first side of the upper plate to move towards and away from the first side of the lower plate.

25. The adjustable spinal fusion device of claim 17, wherein the device is configured for advancement in a direct lateral approach to the first and second vertebral bodies.

26. The adjustable spinal fusion device of claim 17, wherein the device is configured for a transforaminal lumbar interbody fusion (TLIF) approach to the first and second vertebral bodies.

* * * * *